(12) United States Patent
Corcoran et al.

(10) Patent No.: US 10,984,284 B1
(45) Date of Patent: Apr. 20, 2021

(54) SYNTHETIC AUGMENTATION OF DOCUMENT IMAGES

(71) Applicant: Automation Anywhere Inc., San Jose, CA (US)

(72) Inventors: Thomas Corcoran, San Jose, CA (US); Vibhas Gejji, Fremont, CA (US); Stephen Van Lare, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 171 days.

(21) Appl. No.: 16/195,273

(22) Filed: Nov. 19, 2018

(51) Int. Cl.
*G06T 3/00* (2006.01)
*G06T 11/20* (2006.01)
*G06T 11/00* (2006.01)
*G06K 9/62* (2006.01)

(52) U.S. Cl.
CPC ......... *G06K 9/6255* (2013.01); *G06K 9/6256* (2013.01); *G06T 3/0006* (2013.01); *G06T 11/001* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 9,171,359 B1 * | 10/2015 | Lund | G06K 9/00449 |
| 10,015,503 B1 * | 7/2018 | Ahammad | G06T 5/001 |
| 2019/0266692 A1 * | 8/2019 | Stach | G06T 1/0028 |

* cited by examiner

Primary Examiner — Idowu O Osifade
(74) Attorney, Agent, or Firm — Appleton Luff

(57) ABSTRACT

A computerized method and system for adding distortions to a computer-generated image of a document stored in an image file. An original computer-generated image file is selected and is processed to generate one or more distorted image files for each original computer-generated image file by selecting one or more augmentation modules from a set of augmentation modules to form an augmentation sub-system. The original computer-generated image file is processed with the augmentation sub-system to generate an augmented image file by altering the original computer-generated image file to add distortions that simulate distortions introduced during scanning of a paper-based representation of a document represented in the original computer-generated image file.

21 Claims, 25 Drawing Sheets

Automation Anywhere, Inc.
633 River Oaks Pkwy
San Jose, CA 95134

Date: Dec 4, 2017

Payment Terms: NET 30

Due Date: Jan 1, 2018

Bill To:
Your Company, Inc.
123 Fake St.
San Jose, CA 95134

Balance Due: $66⁴⁹

| Item | Quantity | Rate | Amount |
|---|---|---|---|
| Widget | 3 | $1 | $3 |
| Gadget | 4 | $2 | $8 |
| Stuff | 100 | $0.50 | $50 |

Subtotal: $61

Tax (9%): $5⁴⁹

Total: $66⁴⁹

FIG. 4A

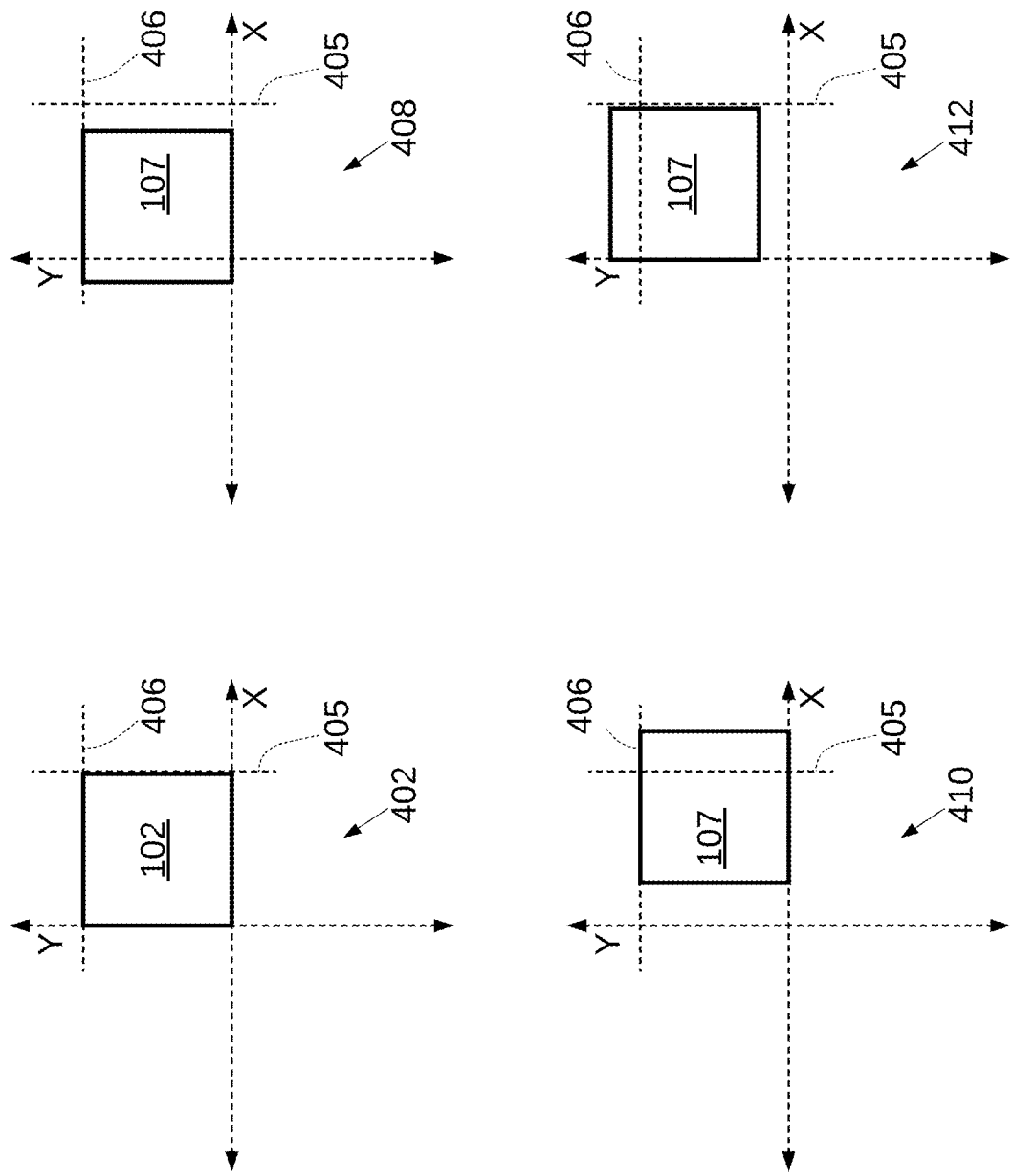

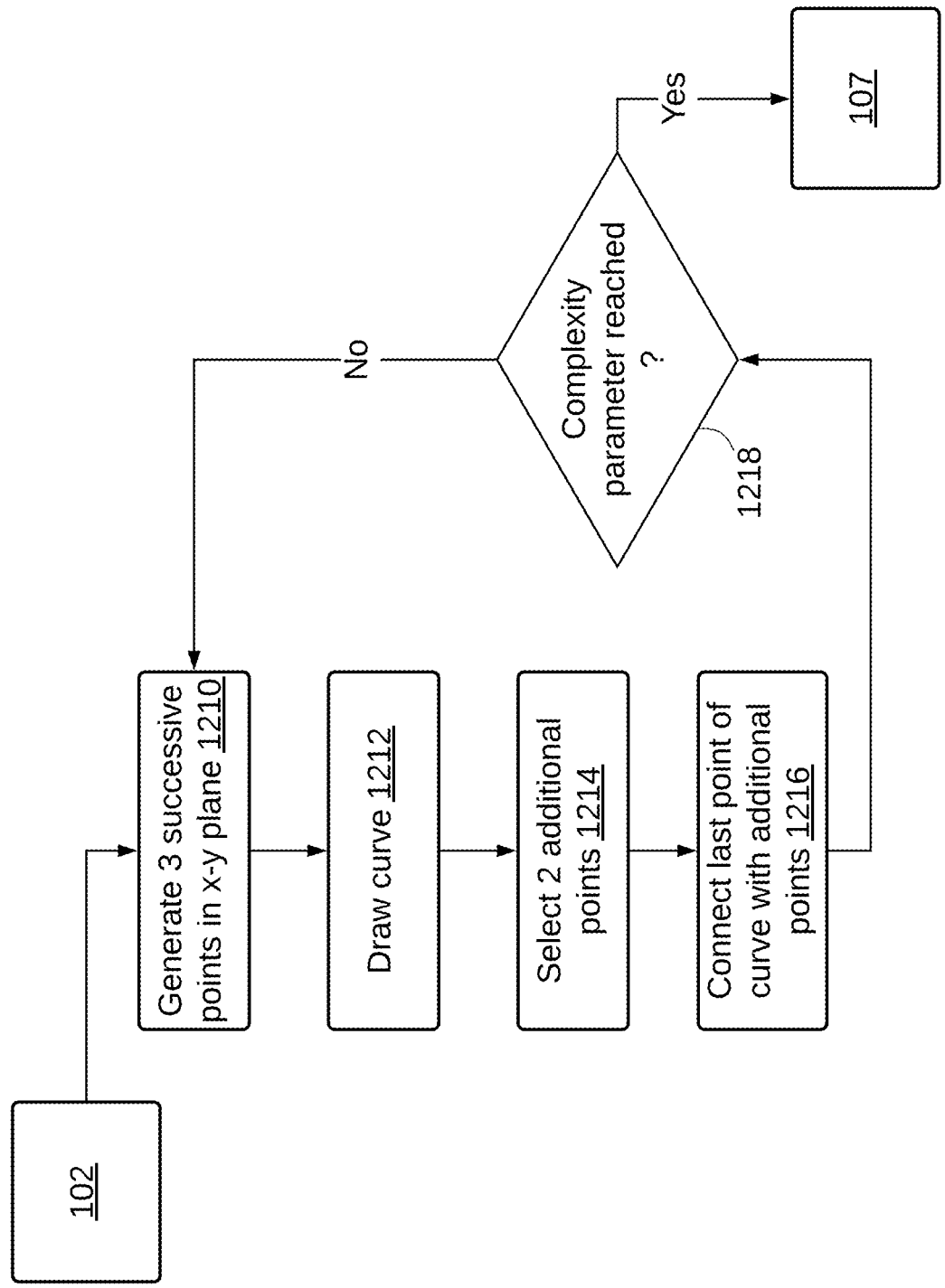

SYNTHETIC AUGMENTATION OF DOCUMENT IMAGES

FIELD OF THE DISCLOSURE

This disclosure relates generally to the field of data processing systems and more particularly to modification of digitized documents.

BACKGROUND

Accurate identification and extraction of data from business documents is an important aspect of computerized processing of business documents. Some business documents are exchanged in an electronic format that permits automatic, or semi-automatic importation of required information into a computer program for processing. A large volume of business documents however are exchanged in an image format, such as paper, or an electronic representation of an image format, such in Portable Document Format (PDF), or other image formats (TIFF, JPEG, etc.). Typically, such business documents are structured in some way to facilitate at least visual recognition of pertinent fields in the document. Automating the processing of such documents is challenging due to the variability in formatting and image quality in such documents. Often, such documents are received in paper form and scanned to generate an image file, which is then processed in a workflow to extract relevant information. Automated recognition of the fields and associated values in a document can greatly enhance the efficiency with which such documents are processed. Typically, for a particular type of document, such as an invoice, expense report or purchase order, there will be variability in the specific information contained. While any particular type of business document will have a number of fields that are necessary, and commonly found, such fields will be formatted differently among different documents and will be positioned differently on the document. Moreover, even if two documents have the same fields and are in the same format, there may be visually perceptible differences, such as from scanning artifacts and different image resolutions, that can prove challenging to automated scanning and recognition systems. Machine learning systems, such as those that employ Deep Neural Networks (DNNs), are increasingly employed to facilitate recognition of information in image documents. Typically, machine learning systems improve with increasing amounts of data, and large data sets are often required to achieve satisfactory performance of the machine learning system. In a business context, it can be challenging to obtain the large variety of documents needed for adequate machine learning as often such data is confidential, or prohibitively expensive. Accordingly, there is a need for improved computerized systems and methods for generating document images of the type that are useful in training a learning-based document image recognition system.

SUMMARY

Computerized methods and systems for adding distortions to a computer-generated image of a document stored in an image file are disclosed herein. An original computer-generated image file is selected from a set of image files and is processed one or more times to generate one or more distorted image files for each original computer-generated image file. This may be performed by selecting one or more augmentation modules from a set of augmentation modules to form an augmentation sub-system. The original computer-generated image file is processed with the augmentation sub-system to generate an augmented image file by altering the original computer-generated image file to add distortions that simulate distortions introduced during scanning of a paper-based representation of a document. The augmented image file may be stored for subsequent retrieval and use for training in a deep learning network. In addition to supporting the training of deep learning systems, document augmentation can be used to test individual preprocessing components.

The synthetic generation of distortions permits precise knowledge of the amount of noise, skew or other augmentations introduced into the augmented image files and therefore permits precise measurement of how well a deep learning system corrects for these augmentations. Furthermore, this permits training of a preprocessing step, which is today solved by traditional computer vision approaches, entirely from synthetic augmentations generated by the disclosed framework. The disclosed methods and systems employ a suite of augmentation modules derived from statistics and computer vision to recreate noise that is typically found in flatbed-scanned document images. Disclosed are augmentation modules employing affine transformation for scaling and rotating, non-affine transforms to model ink spread, scanning artifacts from improperly fed documents, multi-scale Gaussian noise to model ink and paper noise, and many other effects that are prevalent in scanned document images.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 4A shows an example of image 200 modified by affine transformation.

FIGS. 4B, 4C, 4D and 4E illustrate various operations in an affine transformation.

FIG. 12B illustrates operation of a signature and handwriting module.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Disclosed herein are computerized systems and methods that synthetically augment document image files to generate augmented image files that contain distortions to the document image encoded in the original document image file. The distortions resemble a range of distortions that may typically be introduced into a document image that is generated by scanning a paper document. The augmented image files may be used to improve training of DNNs by increasing the amount of training data available for the DNN. In addition to supporting the training of deep learning networks, document augmentation can be used to test individual preprocessing components. Since the amount of noise, skew or other augmentations is precisely known, precise tests may be performed to determine how well a deep learning network corrects for the augmentations introduced into the image files. Furthermore, a preprocessing step may be trained, which is typically solved by traditional computer vision approaches, entirely from synthetic augmentations generated by the disclosed systems and methods. The disclosed systems and methods employ a suite of tools from statistics and computer vision to recreate noise that is typically found in flatbed-scanned document images. Specifically, the disclosed systems and methods use affine transformation for scaling and rotating, non-affine transforms to model ink spread, page segmentation to add patterned noise, scanning artifacts from improperly fed documents, multi-scale Gaussian noise to model ink and paper noise, and many other effects that are prevalent in scanned document images.

Figure 1A:
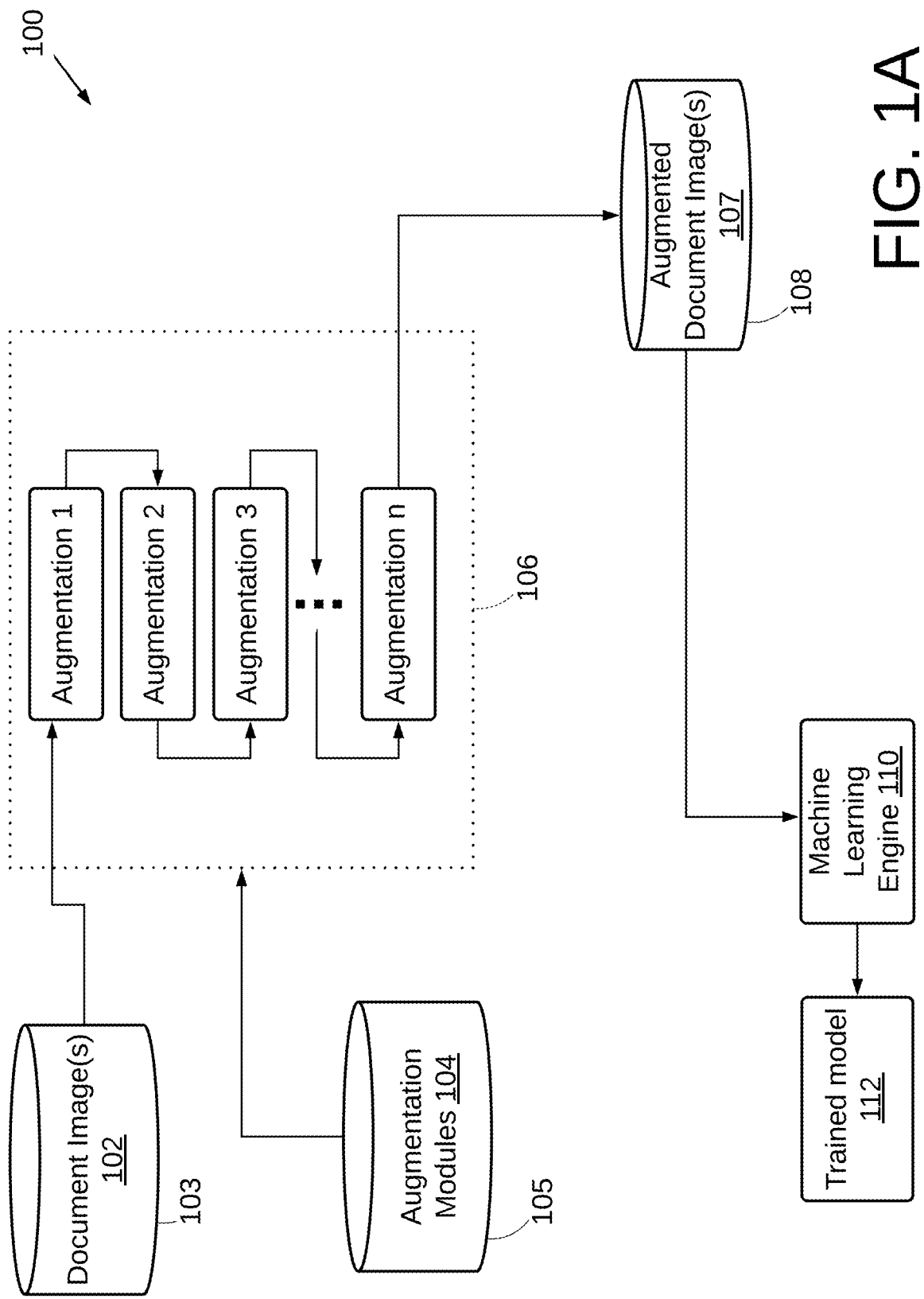
FIG. 1A is a high-level block diagram of an embodiment of a document image augmentation system 100.

FIG. 1A is a high-level block diagram of an embodiment of a document image augmentation system 100. A corpus of original image documents 102 may include a variety of different types of business documents, stored in at least an image format, such as PDF, JPEG, TIFF. The business documents will typically be of a document type that is processed regularly by an organization, such as an invoice, purchase order, job application and travel expense report. Other business documents may be more specific to an organization's business. For example, a financial institution may use a loan application form, or a healthcare organization may use a patient intake form. Business documents, and in particular, an invoice are disclosed herein, in the context of the disclosed embodiments. The disclosed embodiments are not limited though to processing of business documents. Other types of documents may also be augmented by the disclosed embodiments.

The system 100 includes a plurality of augmentation modules 104, where each augmentation module 104 operates to augment an original document image 102, or a previously augmented image, in a specific manner to introduce into the original document image 102 a type of distortion typically incurred when scanning a paper document. The augmentation modules 104 are stored in storage 105 and may be selected, either manually or automatically, to form an augmentation sub-system 106 to process an original document image 102 with one or more augmentations. In one embodiment, any of the augmentation modules 104 may be combined in a consistent sequence such that the original document image 102 is passed from one augmentation module 104 to another undergoing each augmentation serially. The original document image would be passed to the first augmentation module 104 (Augmentation 1) in the sequence of the augmentation sub-system 106, and the output of the first augmentation module 104 in the sequence (Augmentation 1) is a first intermediate modified form of the document image 102 that is passed to the next augmentation module 104 (Augmentation 2) in the augmentation sub-system 106 which in turn provides a second intermediate modified form of the document image that is passed to the next augmentation module 104 (Augmentation 3) and so forth until the final augmentation module 104 in the sequence (Augmentation n) produces the final augmented document image 107. In another embodiment, the augmentation modules 104 may be combined randomly in a sequence such that 1-n augmentation modules 104 are applied in a random order on the document image 102.

Figure 1B:
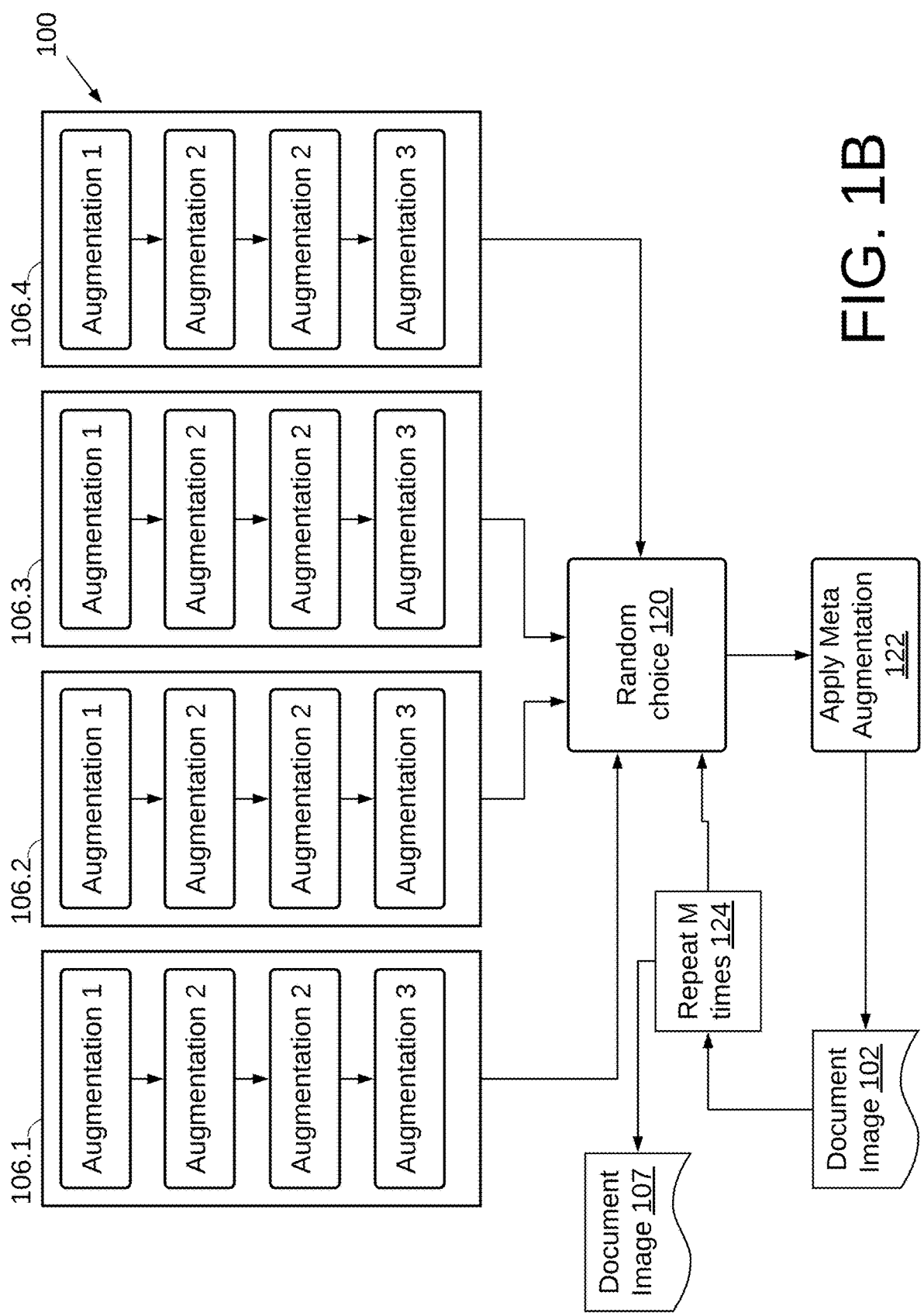
FIG. 1B shows an alternative embodiment of aspects of the document image augmentation system 100 of FIG. 1A.

In another embodiment, seen in FIG. 1B, sequences of augmentation modules 104 may be composable such that a random sequence of augmentation modules 104 may be composed of several strictly ordered augmentation modules 104. In such an embodiment, a plurality of meta-augmenters (shown as 106.1, 106.2, 106.3 and 106.4) may be constructed that contain a desirable sequence of augmentations but still vary the order of these meta-augmenters to give even more randomness to the system 100. In FIG. 1B, each augmentation subsystem 106.1, 106.2, 106.3, 106.4 is composed of a sequence of selected augmentation modules 104. One of the meta-augmenters is selected by random choice module 120 and is applied to document image 102 at 122. The selection of a meta-augmenter at 120 and application of the meta-augmentation to (after the initial pass) an augmented form of the document image 102 is performed (repeated) a number of times (M), seen at 124, to generate final augmented document image 107.

The result of processing by the augmentation sub-system 106 is to generate augmented document images 107 which are stored to data storage 108. The data storage 105 and 108 are shown to be separate from each other and from data storage 103 for simplicity of explanation. The data storage 103, 105 and 108 may be separate systems or may be part of the same data storage system. The data storage 108 may contain multiple augmented document images 107 for each document image 102. This permits replication of various permutations of distortions that may be introduced into a document image during scanning. The augmented document images 107 are available to a conventional DNN type machine learning engine 110 to process to generate a trained model 112 which may be used to process a corpus of scanned document images.

Figure 2:
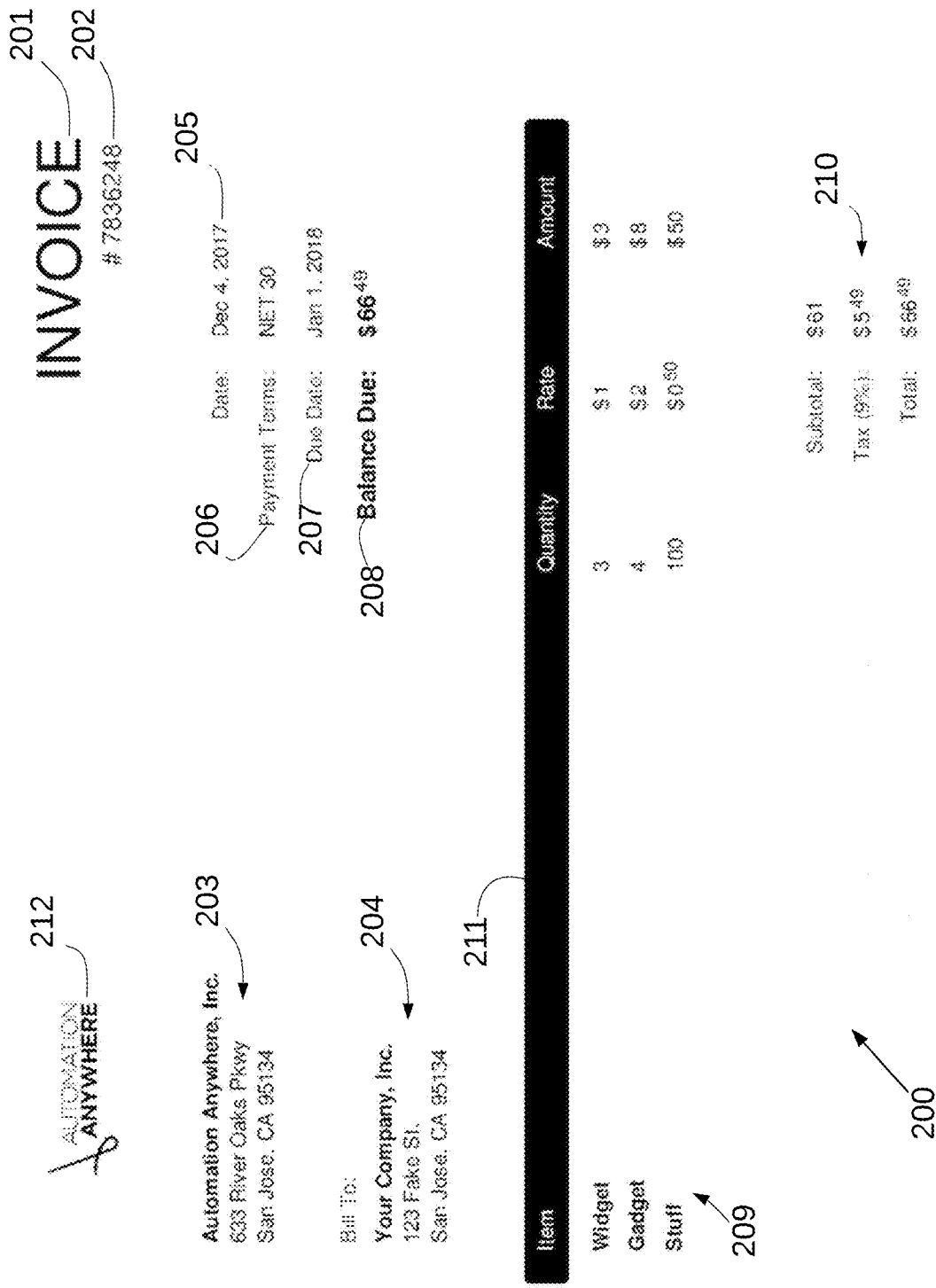
FIG. 2 shows an example of a typical domain document (English-language invoice) converted to a monochrome image.

An example of a typical domain document (English-language invoice) converted to a monochrome image, and an example of a specific instance of an image document 102 may be seen in FIG. 2. The invoice 200 in FIG. 2 may be computer generated to form an original image file 102 which represents in a sense an ideal representation of a document with no artifacts or distortions introduced into the original image. To enhance readability of the text on the invoice 200, the bottom portion of the document, which has no text, is not shown, to permit enlargement of the upper portion which contains text. As seen, invoice 200, which may be one of the document images 102, has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204. In addition, the invoice has a date field 205, payment terms 206, a due date 207 and a balance due 208. An itemized listing of the items supplied by the invoicing entity is shown at 209, with associated amounts for quantity, rate (price per item), and total amount for the item. Subtotal amount, tax and total are shown at 210. The invoice 200 can also be seen to be formatted with text of different sizes and with varying font characteristics such as the use of bold font in certain places such as for "Balance Due" at 208 for the label "Balance Due" and the associated amount "$66.49". As seen the amount 66.49 is in a form in which the cents are represented in a smaller font, in superscript format. As will be appreciated by those skilled in the art, alternative representations may also be found in other invoices. Different sizes of fonts are also used, such as for Invoice field 201 which is in a larger font than other fields. A company logo is also seen at 212. Also, a table header bar is seen at 211 with text in reverse color (white on black) contained therein. The present specification provides an example of an invoice as a business document containing visually perceptible geometric structure. The principles described herein also apply to other types of business documents where the documents of a particular type (such as a purchase order, job application, expense report, loan application, medical record) have a similar geometric structure.

Figure 3:
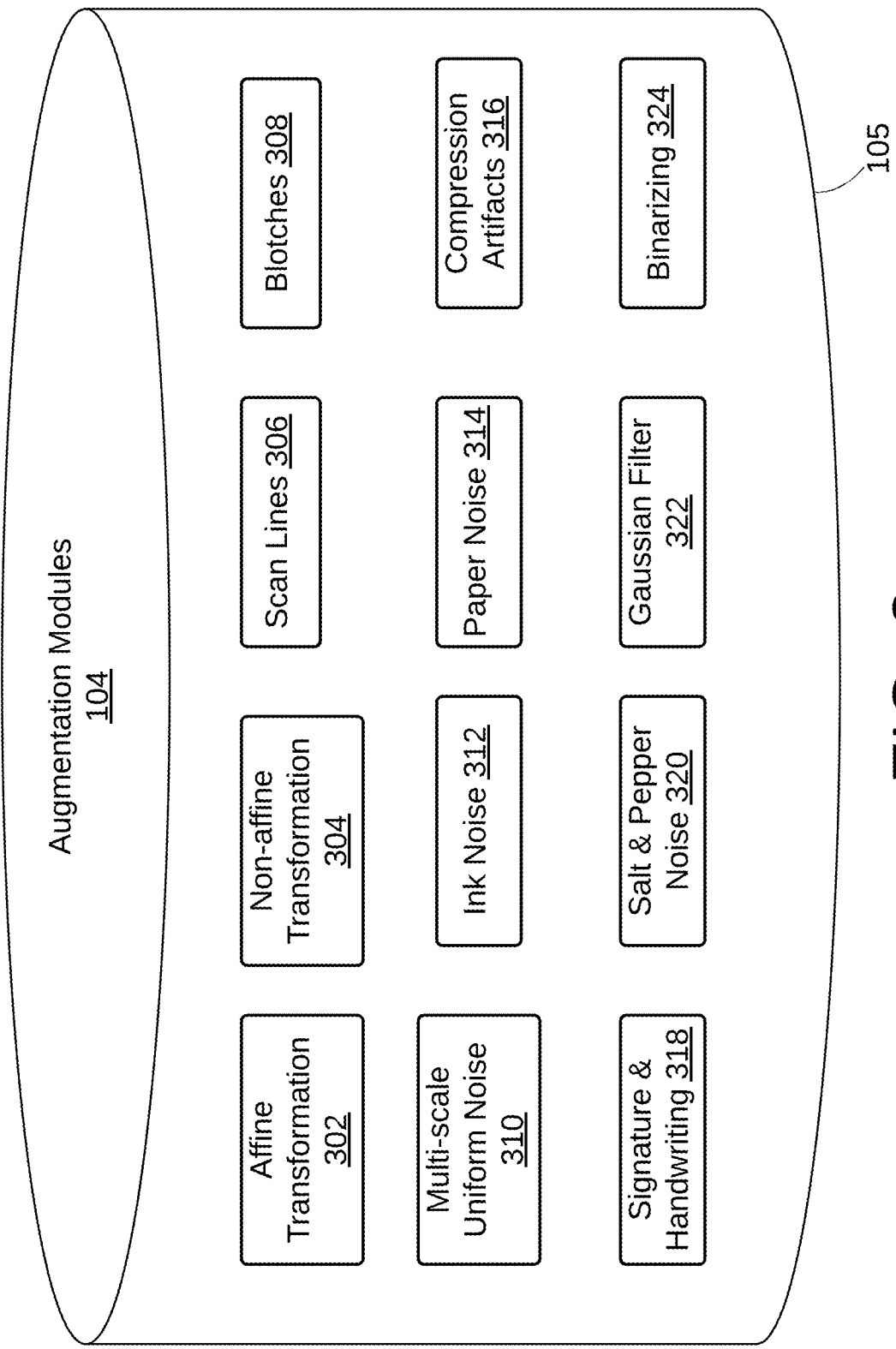
FIG. 3 shows further details of the augmentation modules 104 of FIG. 1A

FIG. 3 shows further details of the augmentation modules 104 of FIG. 1A. In the embodiment of FIG. 3, twelve augmentation modules 104 are shown. In other embodiments a subset of the augmentation modules may be employed. In other embodiments, augmentations generated by augmentation modules other than those shown in FIG. 3 may be employed in addition to or in lieu of the augmentation modules 104 shown in FIG. 3.

Affine transformation module 302 transforms a document image 102 in accordance with an affine transformation as is known in geometry. A typical affine transformation is a function between affine spaces which preserves points, straight lines and planes. Sets of parallel lines remain parallel after an affine transformation. An affine transformation does not necessarily preserve angles between lines or distances between points, though it does preserve ratios of distances between points lying on a straight line. Examples of affine transformations include translation, scaling, homothety, similarity transformation, reflection, rotation, shear mapping, and compositions of them in any combination and sequence.

Non-affine transformation module 304 transforms a document image 102 in accordance with a non-affine transformation as is known in geometry. A typical non-affine transformation has the capability to transform a rectangle into any convex quadrilateral, where a convex quadrilateral is a four-sided figure with interior angles always less than 180 degrees and sides that do not cross each other. Said another way, the non-affine transformation module 304 distorts the image file 102 in a way that is not universal to the whole image in the image file 102. In other words, it distorts different parts of image in the image file 102 in different ways.

Scan lines module 306 transforms a document image 102 by adding vertical and horizontal lines to the edges of the document image to simulate a gap between the scanned document and the edge of the scanner sensor. It can also simulate folded pages, or documents that were scanned with other documents on top. The thickness, number, and orientation of the lines may be varied. Additionally, a small amount of skew may be added to the added lines, so they are not parallel to the document edges to simulate imperfect document feeds when scanning.

Blotches module 308 transforms a document image 102 by adding "blotches" to the image file 102, in the form of uniformly black irregular spots, to simulate dirt on the scanner bed. Multi-scale uniform noise module 310 transforms a document image 102 by adding multiscale noise to simulate physical effects in both the paper and the ink of scanned documents. This attempts to model effects of different sources of noise, each of which has its own uniform distribution at a certain scale. Ink noise module 312 transforms a document image 102 by adding to black areas of the document image, jittering, such as to text, to simulate bleeding of ink and similar printing imperfections. Paper noise module 314 transforms a document image 102 by adding to non-black areas of the document image (i.e. the document background) imperfections that may appear in paper. Compression artifacts module 316 transforms a document image 102 by recreating compression artifacts sometimes found in images by using different lossy image compression formats. Signature and handwriting module 318 transforms a document image 102 by adding random handwriting and signature images to the document image 102 to simulate annotations on machine-printed documents. Salt & Pepper Noise module 320 transforms a document image 102 by adding a uniform distribution of single pixels chosen to be turned white (salt) or turned black (pepper). Gaussian Filter module 322 transforms a document image 102 by applying a traditional 2-d Gaussian filter applied to the image 102. Binarizing module 324 transforms a document image 102 by applying a binarizing filter from any number of standard implementations or applying a simple thresholding function.

FIG. 4A shows an example of image 200 modified by affine transformation. Here the image has undergone all 5 operations available in the affine transformation module 302. Most notably it has been rotated about the center by 2.4 degrees counter clockwise. Additionally, it has been scaled and translated such that some of the original text (201, 202, 212) has dropped out of the image frame.

Figure 4C:
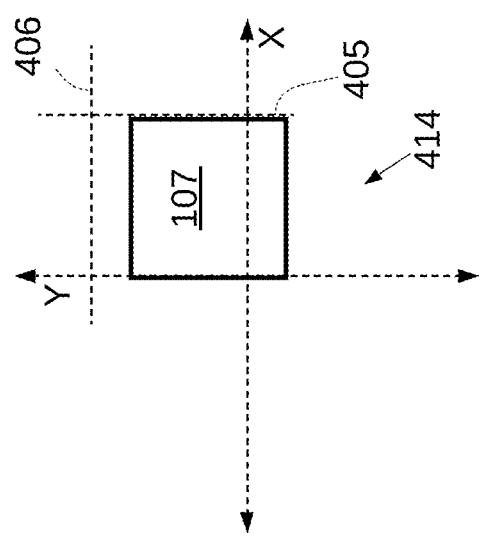
Figure 4C:
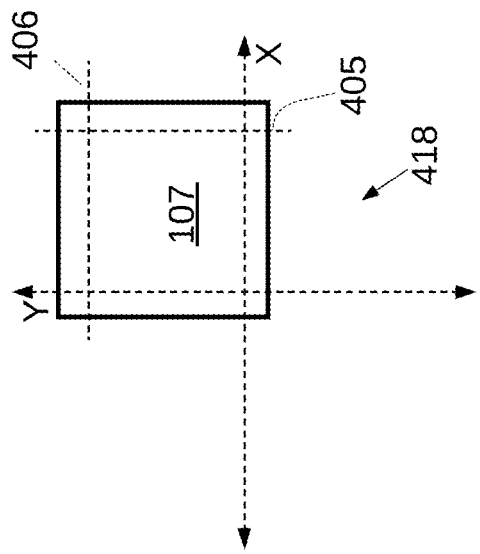
Figure 4C:
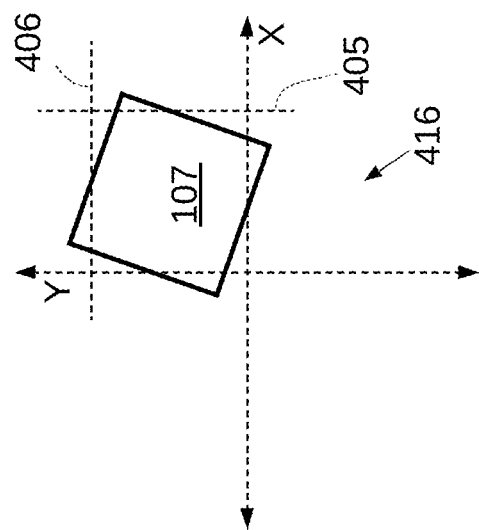
Figure 4C:
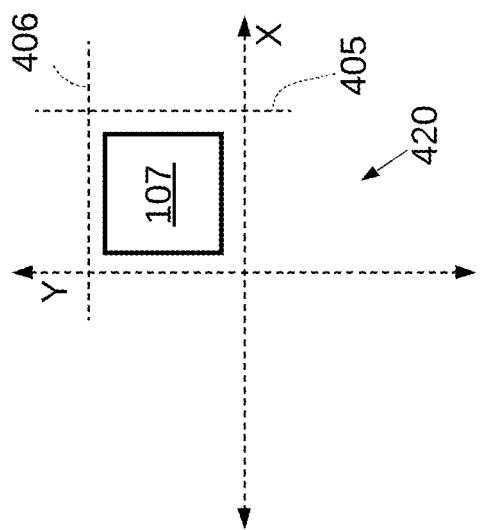
Figure 4D:
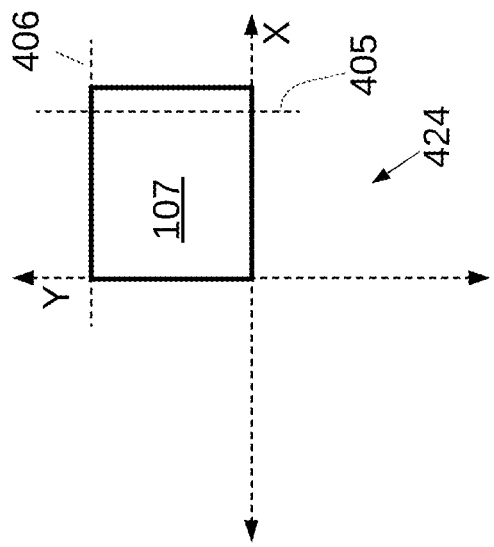
Figure 4D:
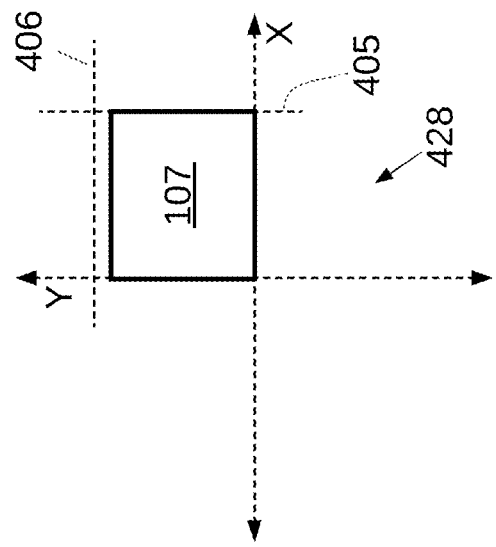
Figure 4D:
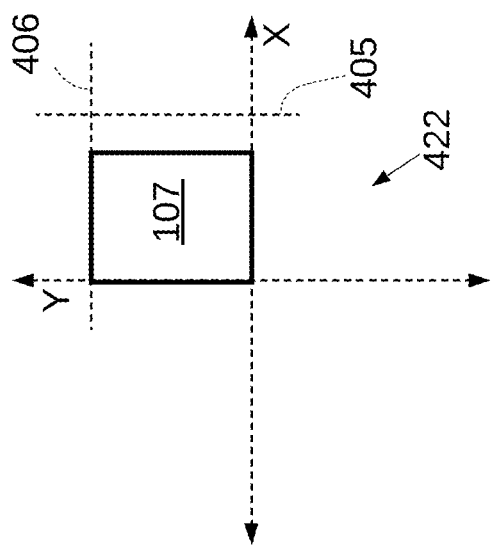
Figure 4D:
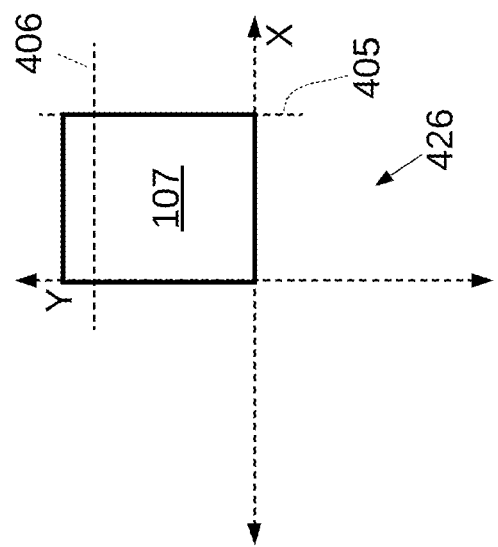

FIGS. 4B, 4C and 4D illustrate the various operations that may performed by an affine transformation. An original image 102 is seen at 402 where image 102 is aligned on its left edge with the Y-axis and on the bottom edge with the X-axis. The right and top edges align with dotted vertical line 405 and dotted horizontal line 406. In one embodiment the affine transformation consists of 5 operations, which may be used individually or in combination to generate augmented image 107. One is translation which determines how much to move the image to the left, right or up, down, each of which may be controlled by the affine transformation module 302. The relevant linear transformation matrix to perform the translation is given by the transformation matrix seen below.

$$\begin{bmatrix} 1 & 0 & x \\ 0 & 1 & y \\ 0 & 0 & 1 \end{bmatrix}$$

Here x and y control the shift in the X and Y directions. This is seen at 408 (move image to the left), 410 (move image to the right), 412 (move image up), and 414 (move image down). An example of an affine transformation in the scanning of a paper document may arise from the alignment of the paper document in the scanner. The paper may be shifted to the left or to the right, or scanning begin earlier or later than it should resulting in the alignment being shift down or up. The second transformation is rotation, seen at 416, the amount of which may be controlled by the affine transformation module 302 and given by the equation seen below where the parameter theta controls the rotation amount around the center of the image.

$$\begin{bmatrix} \cos(\theta) & \sin(\theta) & 0 \\ -\sin(\theta) & \cos(\theta) & 0 \\ 0 & 0 & 1 \end{bmatrix}$$

As seen at 416, the image 107 is rotated about a center point in the image. The third transformation is scale, seen at 418 (enlargement), and 420 (shrinking), the amount of which may be controlled by the affine transformation module 302 and given by the equation seen below where the parameter s controls the enlargement or shrinking of the image.

$$\begin{bmatrix} s & 0 & 0 \\ 0 & s & 0 \\ 0 & 0 & 1 \end{bmatrix}$$

As seen at 418, the image 102 has been uniformly enlarged in the X and Y dimensions. At 420, the image 102 has been uniformly shrunk in the X and Y dimensions. The fourth transformation is anisotropic scale, which determines how much to enlarge or shrink the image separately in each dimension (X and Y) and is given by the equation below where w and h control the scale of the width and height.

$$\begin{bmatrix} w & 0 & 0 \\ 0 & h & 0 \\ 0 & 0 & 1 \end{bmatrix}$$

Figure 4E:
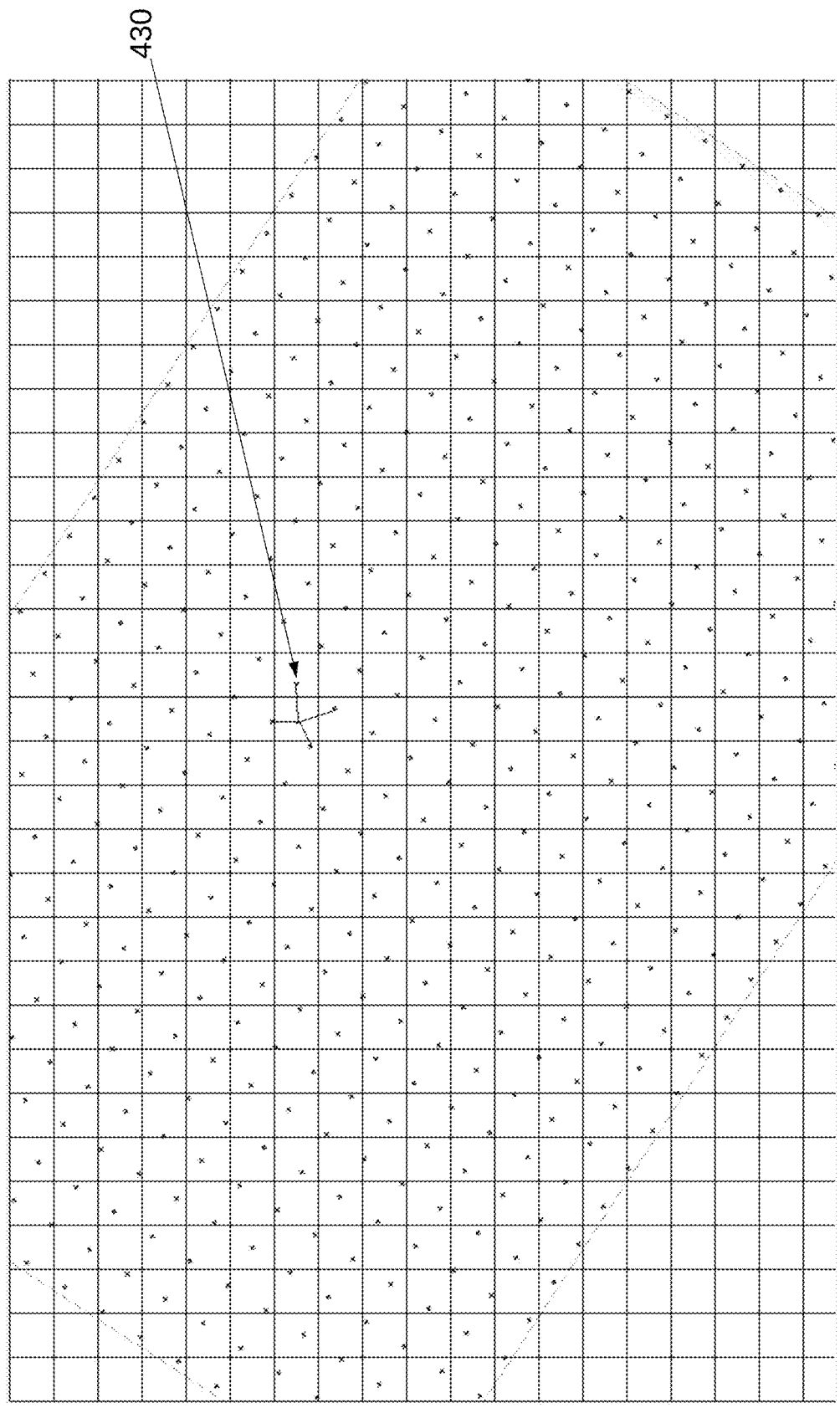

At 422, the image 102 has been shrunk in only the X-dimension and at 424 has been enlarged in only the X-dimension. At 426, the image 102 has been enlarged in only the Y-dimension and at 428 has been shrunk in only the Y-dimension. The fifth transformation operation is interpolation scale, the pixels to be filled in (when enlarging) or removed (when shrinking) is controlled by the affine transformation module 302. In FIG. 4E interpolation is illustrated by way of example. Here the original image matrix, array of cross-hatch marks, is shown to be rotated against an axis-aligned grid representing the new image matrix. Each cell in this grid represents one pixel and should be filled in by averaging the nearest pixels from the rotated image matrix. In this example, bilinear interpolation is shown at 430 where the 4 diagonally nearest pixels are averaged to compute the value for the final image matrix.

Each transformation, except for interpolation, is represented as a standard linear transformation matrix. Composition of the transformations is accomplished though the standard practice of multiplying the transformations matrices. Finally, the composed transformation is applied to the all pixels with the below equation.

$$\begin{bmatrix} x' \\ y' \\ 1 \end{bmatrix} = \begin{bmatrix} w & 0 & 0 \\ 0 & h & 0 \\ 0 & 0 & 1 \end{bmatrix} \begin{bmatrix} x \\ y \\ 1 \end{bmatrix}$$

Figure 5A:
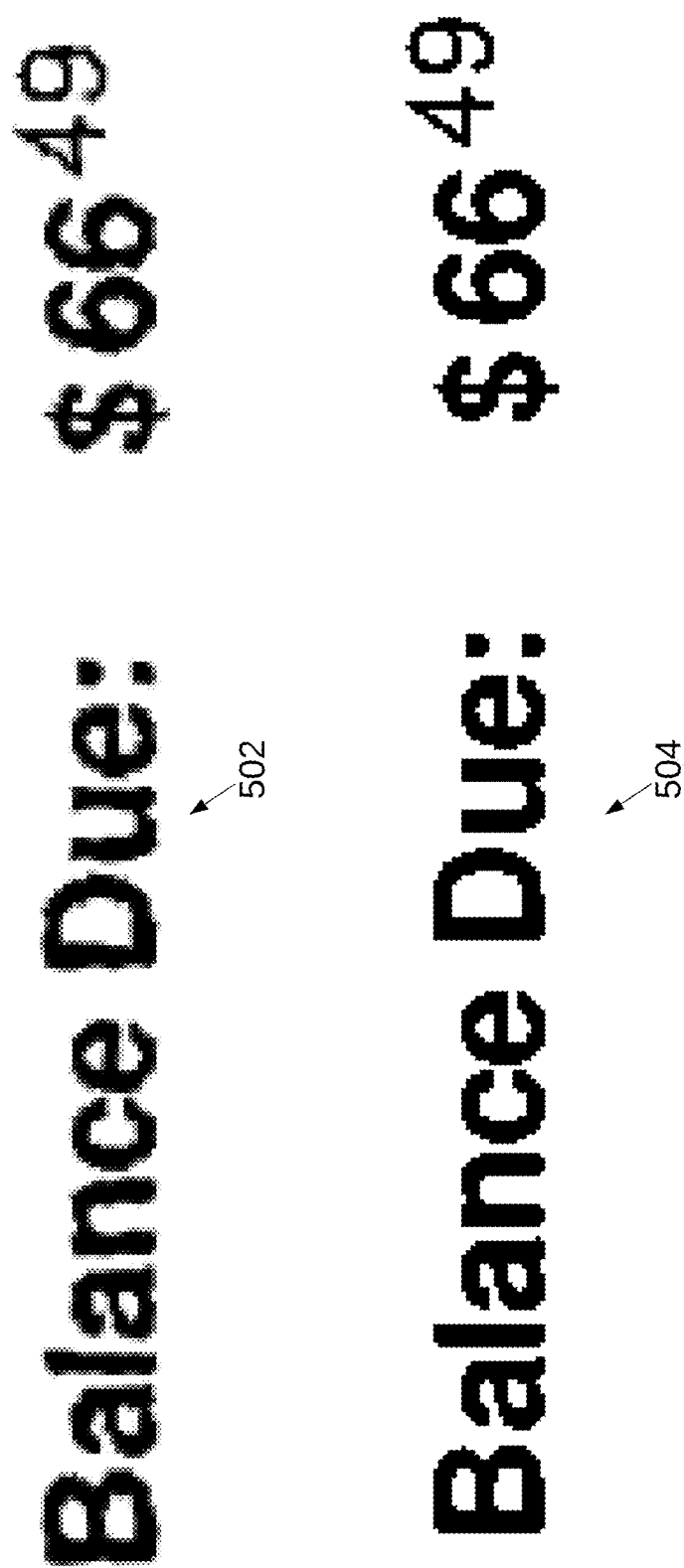
FIG. 5A shows an example of image 200 modified by non-affine transformation.

FIG. 5A shows an example at 502 of a segment of image 200 (208) modified by non-affine transformation. As seen at 502, pixels have been added around the text. The change, which appears as a fuzzing of the characters, can be seen when comparing the same segment 502 with the unaltered image seen at 504.

Figure 5B:
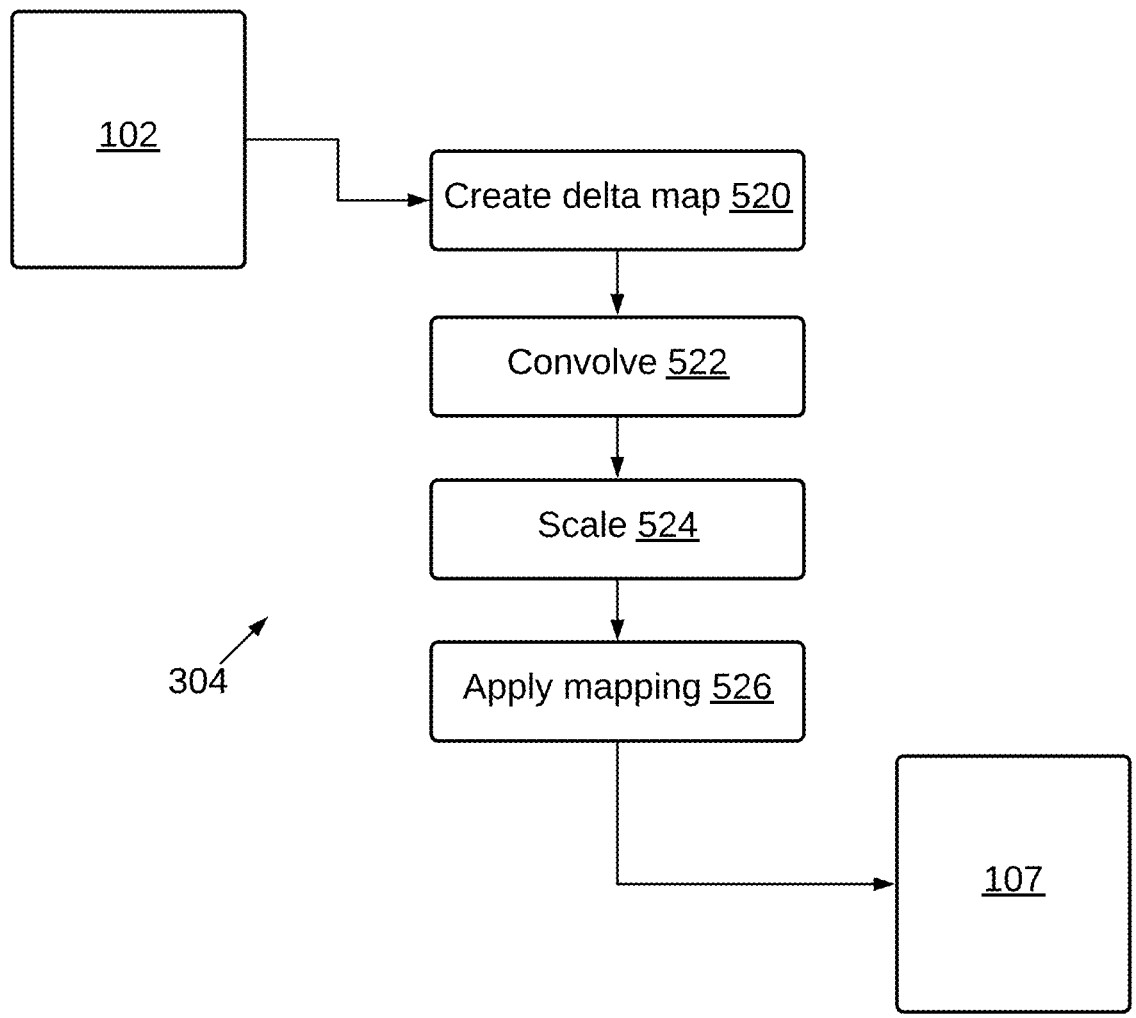
FIG. 5B illustrates operation of a non-affine transformation module.

Operation of the non-affine transformation module 304 is illustrated in FIG. 5B. The non-affine transformation module 304 operates to create a non-linear mapping used for local noise. In one embodiment the module 304 tends to jitter the image 102 in a uniform way with a limited scope, which produces noise that looks like smudged ink or even very small warping that can sometimes occur with scanners. Two parameters are preferably employed: (i) Sigma—the standard deviation of Gaussian that is convolved with the distortion field; this affects how uniform the distribution is over whole image; a large sigma results in an affine transformation; a small sigma results in distortions that can vary greatly across the whole document; (ii) Alpha—a scaling factor for the intensity of deformations; a high alpha results in a high amount of distortion. The non-affine transformation module 304 creates a non-affine transformation map comprising an entry for each pixel of the document 102, where each entry contains information on how much to move each pixel—e.g. if pixel location (3,2) has map value of (5,0)—it means move in x direction to the right, 5 pixels, or (−5,0) means move in x direction to the left 5 pixels. Movements in the y direction may be similarly specified. Generation of the non-affine transformation map by non-affine transformation module 304 is seen in FIG. 5B. A delta map, which is a discrete random uniform map that maps the delta in x and y between the original image 102 and the transformed image 107 is created at 520. The values in the delta map are convolved (smoothed) at 522 with a Gaussian kernel. This helps enforce image-wide deformations in the image 102. For example, when the Gaussian kernel has a very small sigma value, then deformations are uniform random across the entire image. When σ is very large, the distortions field turns into an affine transformation. Each value in the delta map is scaled at 524 to increase or decrease the intensity of the distortion by multiplying with a scalar value. The mapping is applied to the image 102 at 526 using interpolation, i.e. based on pixels immediately surrounding a pixel, to generate augmented image 107.

Figure 6:
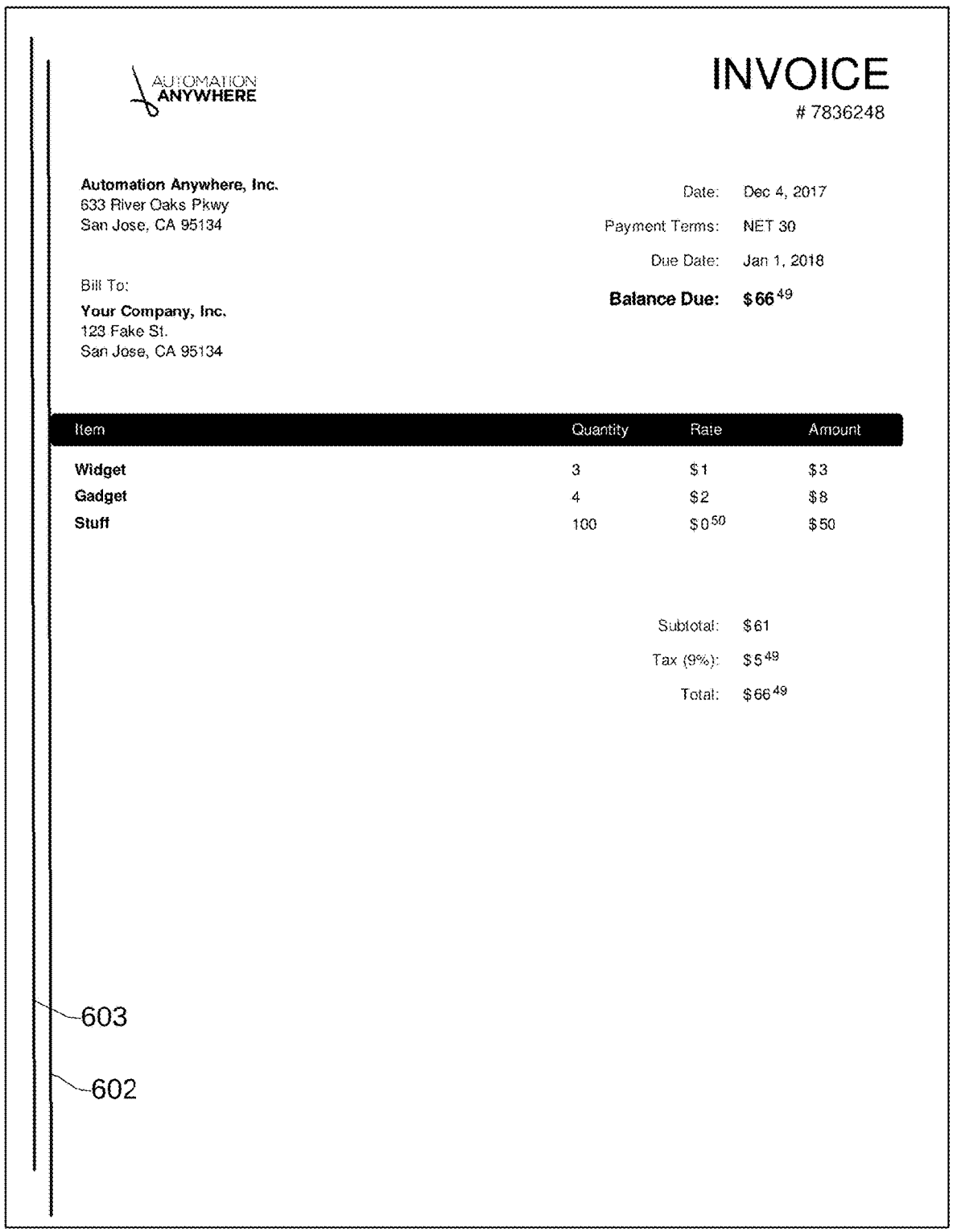
FIG. 6 shows an example of image 200 modified by scan lines.

FIG. 6 shows an example of image 200 modified by vertical scan lines 602 and 603, which simulate a gap between the scanned document and the edge of the scanner sensor, folded pages, or documents that were scanned with other documents on top. The thickness, number, and orientation of the lines may be varied, and a small amount of skew to the lines may be added so they are not parallel to the document edges. The scan lines module 306 preferably employs three parameters to develop scan lines for augmentation of image file 102: (i) Max line intrusion—controls how far from the document edge the lines can be drawn; (ii) Max number of lines; and (iii) Skew factor. Points are picked on the image according to these parameters then black lines are drawn onto the image connecting the points.

Figure 7A:
FIG. 7A shows an example of image 200 modified by blotches.
Figure 7B:
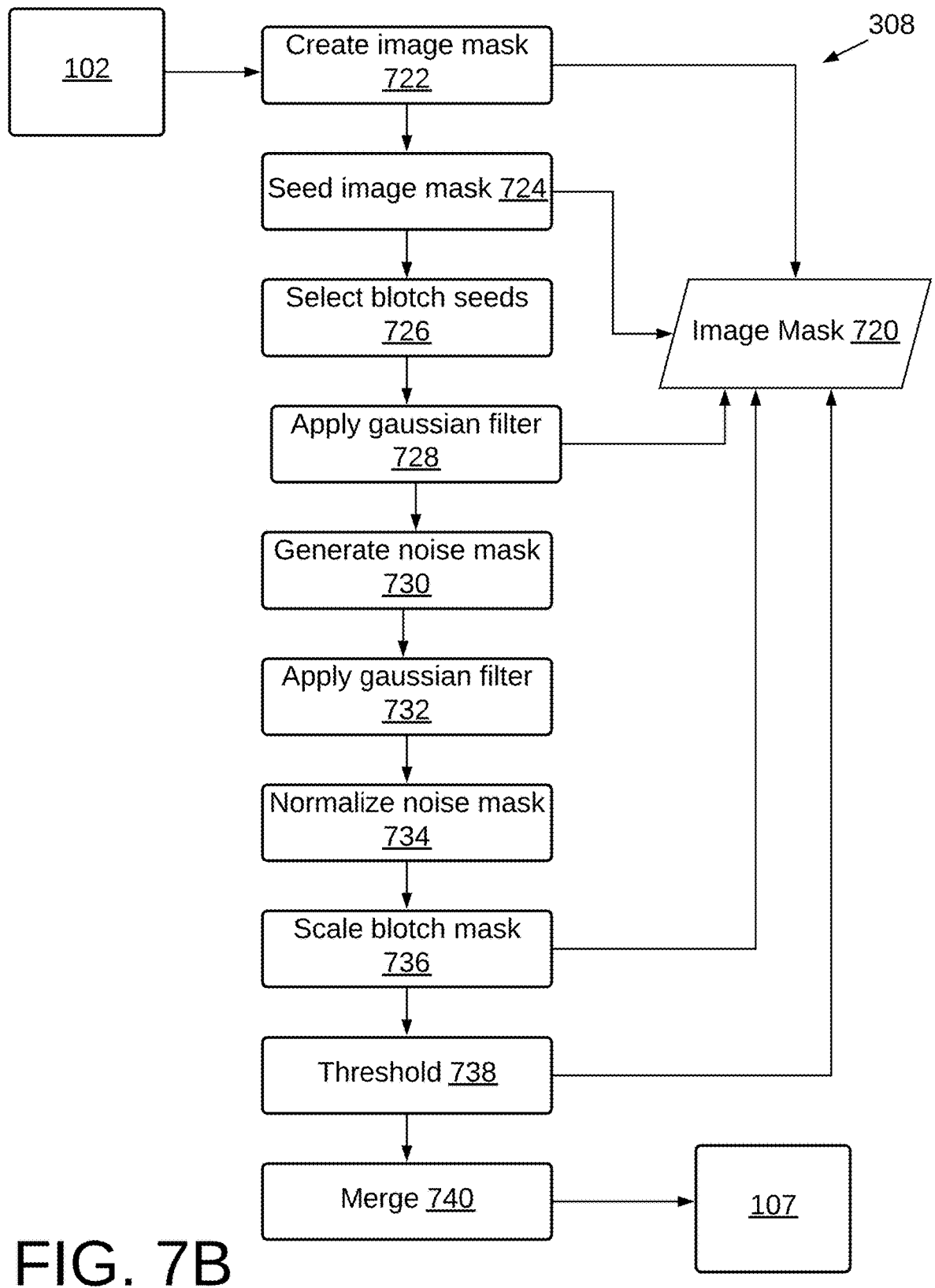
FIG. 7B illustrates operation of a blotches module.

FIG. 7A shows an example of image 200 modified by blotches. As seen in FIG. 7A, a number of black irregular spots on white background, or white irregular spots on black background ("blotches), seen throughout the document and specifically identified at 702, 703, 704, 705, 706, 707 and 708, have been added to simulate dirt on a scanner bed. The blotches module 308 controls the drawing of these blobs by the following parameters: (i) Blob density—how many blobs should exist in a given area; (ii) Blob size—how large the blobs should be; and (iii) Roughness—How non-uniform the edges of the blobs should be. Operation of the blotches module 308 is seen in FIG. 7B. An image mask 720, which contains an entry for every pixel in the image 102 (same height/width as the document image), is created at 722. To create blotches, the image mask 720 is seeded at 724 with a number of blotch seeds, depending on the blotch density, with each block seed consisting of 1 pixel. A random number of blotch seeds is selected at 726 to each form the beginning of a blotch. Each pixel that is within blotch size away from a seed pixel is regarded to form part of a blotch. A Gaussian filter is applied at 728 over the image mask 720 with sigma proportional to the roughness parameter. Uniform noise is added at 730 to another mask (a noise mask) and the Gaussian filter is applied again at 732 to the noise mask. The noise mask is normalized at 734 [so values are between 0 and 1]. The noise mask is used at 736 to scale the blotch mask [so the blotches are non-uniform]. The result in the blotch mask is then thresholded at 738 to remove anything below/above a threshold. The resulting blotch masked is merged at 740 with the original image 102 to generate augmented image 107 containing blotches.

Figure 8A:
FIG. 8A shows an example of image 200 modified by augmentation sub-system 106.

FIG. 8A shows an example of image 200 modified by the augmentation sub-system 106 consisting of the augmentation modules 104: affine transformation 302, non-affine transformation 304, scan lines 306, blotches 308, and binarizing 324.

Figure 8B:
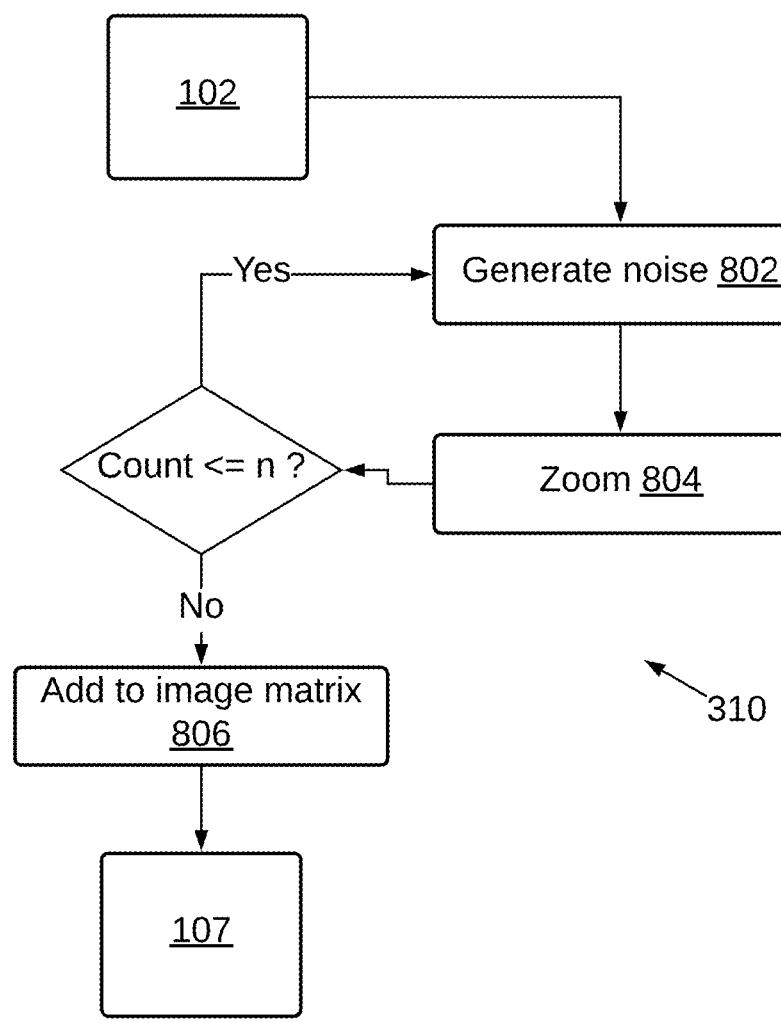
FIG. 8B illustrates operation of a multiscale uniform noise module.

Operation of multi-scale uniform noise module 310 is shown in FIG. 8B. Noise in document images tends to not be uniform, but instead occurs at different scales. The multi-scale uniform noise module 310 sums the different scales at which noise occurs to augment with document image 102 in a manner that provides a more realistic effect. Multiscale noise is employed to simulate physical effects in both the paper and the ink of scanned documents. This attempts to model effects of different sources of noise, each of which has its own uniform distribution at a certain scale. This is modeled by generating at 802, a uniform distribution of noise over a two-dimensional image mask, then at 804 zooming into the image mask. The operations at 802 and 804 are repeated a number of times (n) employing a counter at 806 to crop out and scale back up, after which the result is added to the image mask. The parameters that may be adjusted by this are: (i) scale range—the domain where the scale values can live; and (ii) number of scales—how many scales at which to generate noise.

Figure 9:
FIG. 9 shows an example of image 200 modified by ink noise.

FIG. 9 shows an example of image 200 modified by ink noise. The ink noise module 312 operates in a manner similar to multi-scale uniform noise module 310, except that it modifies only black areas (i.e. non-background information) in the image document 102. Ink noise is simulated by using multiscale noise as described above in connection with FIG. 8B. The noise mask that is generated by steps 802 and 804 is used as a scaler for any non-background information in the image 102, which are pixel values other than pure white in a greyscale document image. In this way, information is only taken away from text or images in the document 102. Noise is not added to any background pixels.

Figure 10:
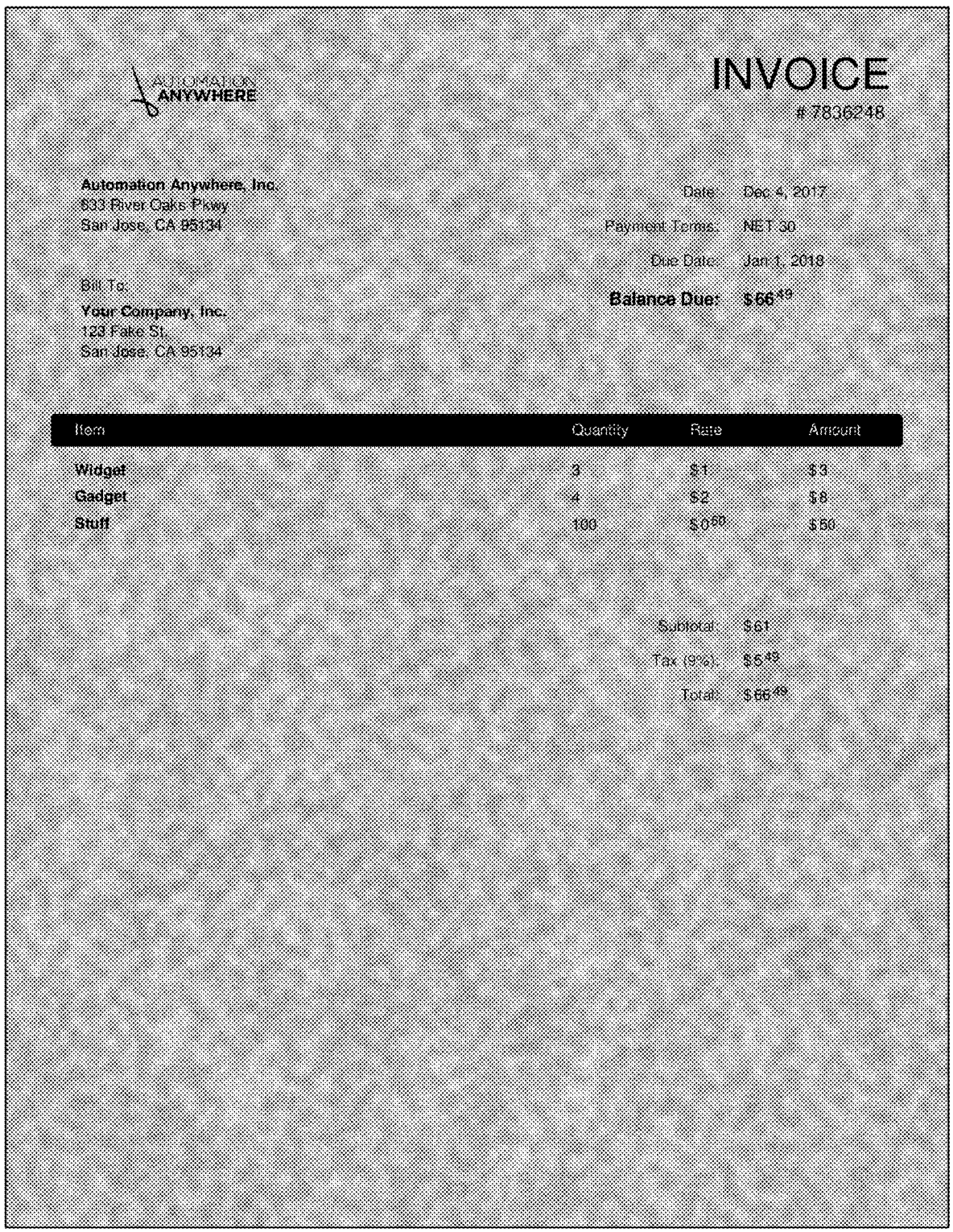
FIG. 10 shows an example of image 200 modified by paper noise.

FIG. 10 shows an example of image 200 modified by paper noise, which may occur due to a colored paper document being scanned to produce a greyscale image. Paper noise module 314 operates in a manner as described above in connection with ink noise module 312, where multiscale noise is introduced to the document image 102, except that noise is added only to the background of the image document 102. In other words, white pixels now may be a greyscale value.

Figure 11:
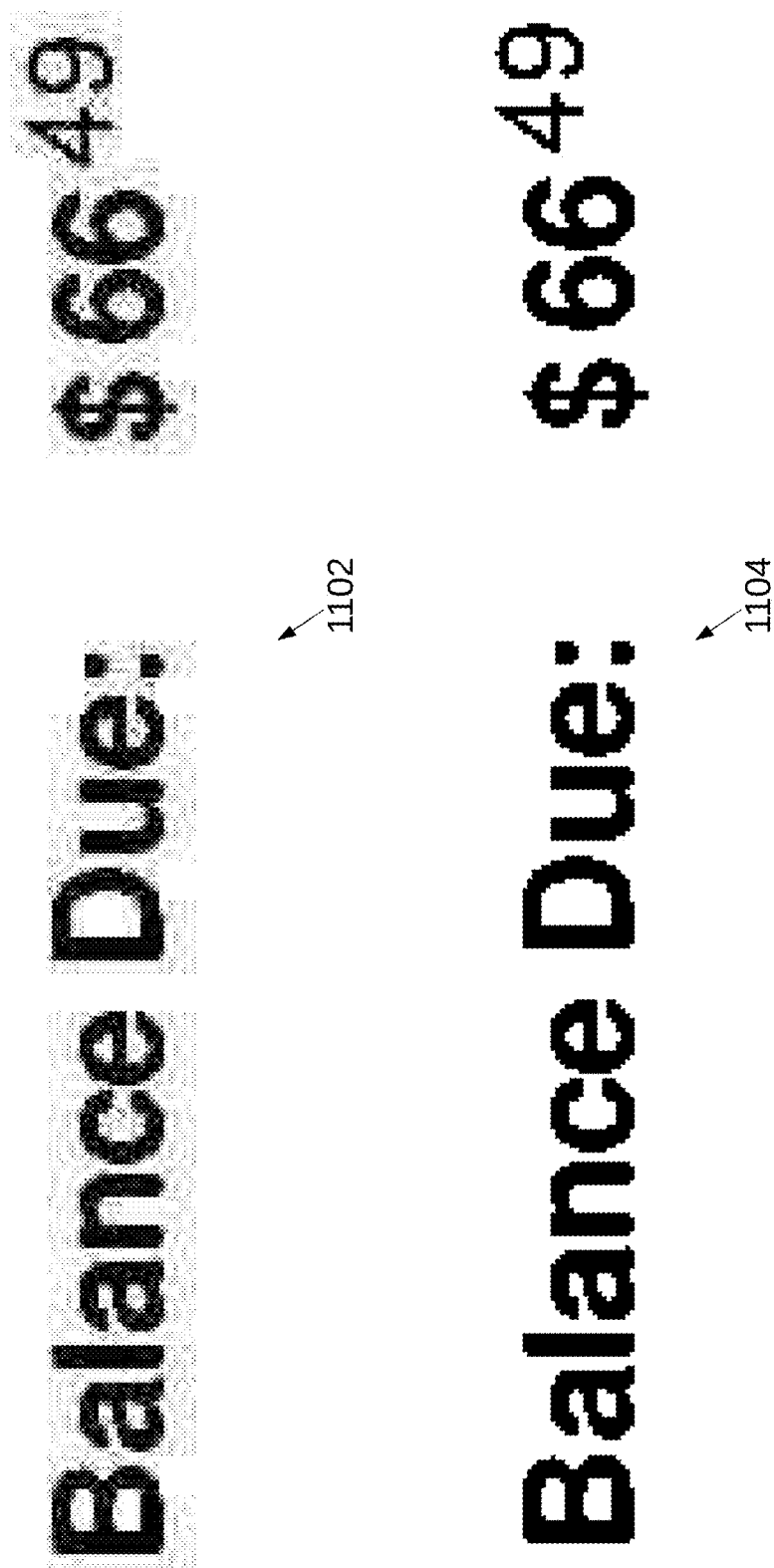
FIG. 11 shows an example of image 200 modified by compression artifacts.

FIG. 11 shows an example at 1102 in a zoomed in segment view of FIG. 2 of portion 208 modified by compression artifacts. Here the noise is the addition of greyish pixels around characters extending outward in a block. The difference where the background surrounding the characters at 1102 now has noise after added compression is noticeable when compared to the unaltered segment seen at 1104.

Compression artifacts module 316 recreates compression artifacts sometimes found in images by using different lossy image compression formats. JPEG compression in particular leaves artifacts in text. The following parameters may be varied: (i) Number of compressions—how many times an image is compressed in a row; (ii) Quality Range—the quality range for JPEG compression (0,100) or PNG compression (0,9); (iii) Format—JPEG or PNG. Employing these parameters, the compression artifacts module 316 compresses the image file 102 to generate artifacts that arise from the number of selected compressions employing the selected format and quality range.

Figure 12A:
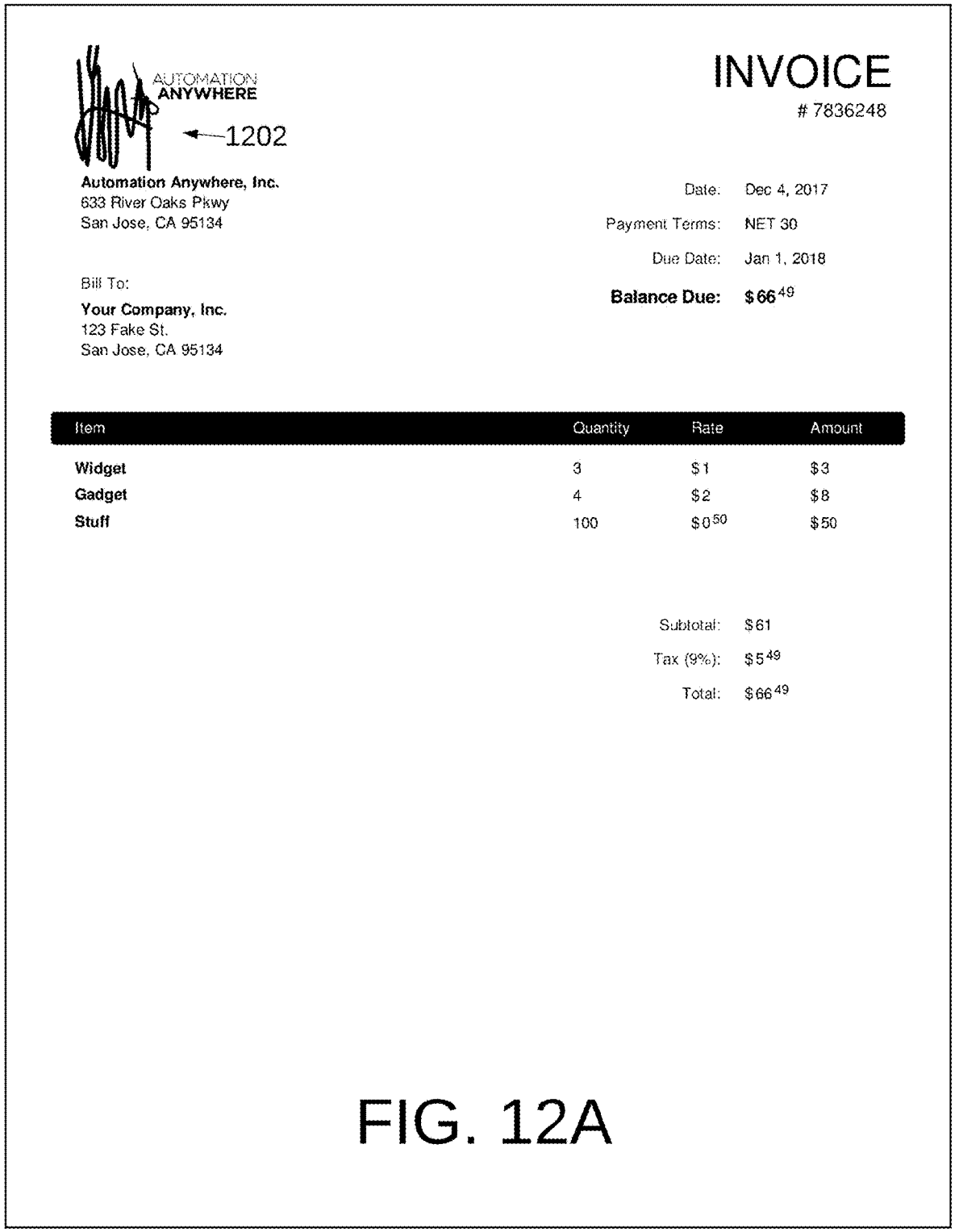
FIG. 12A shows an example of image 200 modified by signature and handwriting.

FIG. 12A shows an example of image 200 modified by signature and handwriting module 318. The handwritten signature seen at 1202 is synthetically generated to mimic handwriting on the document image 102. While a signature is shown, the signature and handwriting module 318 may be employed to generate augmentations that may mimic other handwriting such as notes and remarks on a document image.

Operation of the signature and handwriting module 318 is shown in FIG. 12B. The signature and handwriting module is based on Bézier curves. To create a signature, it plots at 1210, three successive points, in an x-y plane at each iteration. The X component of each point is chosen from a random uniform distribution, then preferably scaled by a momentum factor to bias plotting in the positive direction. Because writing is typically left to right, the next two points tend to be further to the right. Loops are randomly added in the signature by calling another function that draws closed Bézier curves biased in the y-direction, for tall loops. The thickness of the strokes is increased uniformly though morphological operations that increase/decrease thickness of black pixels—called erosion/dilation. The following parameters may be selected: (i) Height range—how tall to make the maximum point in the signature; (ii) Width range—how far apart in the X-direction the signature should be; (iii) Complexity—a parameter of how many strokes the signature should contain, for example a complexity parameter of 10 corresponds to ten iterations of the steps 1210, 1212, 1214 and 1216 in FIG. 12B; (iv) Weight—a parameter for the curvyness of the Bezier curve drawing; (v) Number of signatures—number of signatures to put on a document image; (vi) Thickness—how thick to make the strokes in the signature. Turning back to FIG. 12B, a curve is generated at 1212 from the three points selected at 1210. Two additional points are selected at 1214. The last point of the curve drawn at 1212 is connected with the next two points selected at 1214 to generate a continuous curve of 5 points. Operations 1210, 1212, 1214 and 1216 are repeated by performing the test at 1218 until a complexity parameter, which represents the number of strokes the signature should contain is reached. The resulting synthetically generated set of curves representing handwriting is stored to the augmented image file 107.

Figure 13:
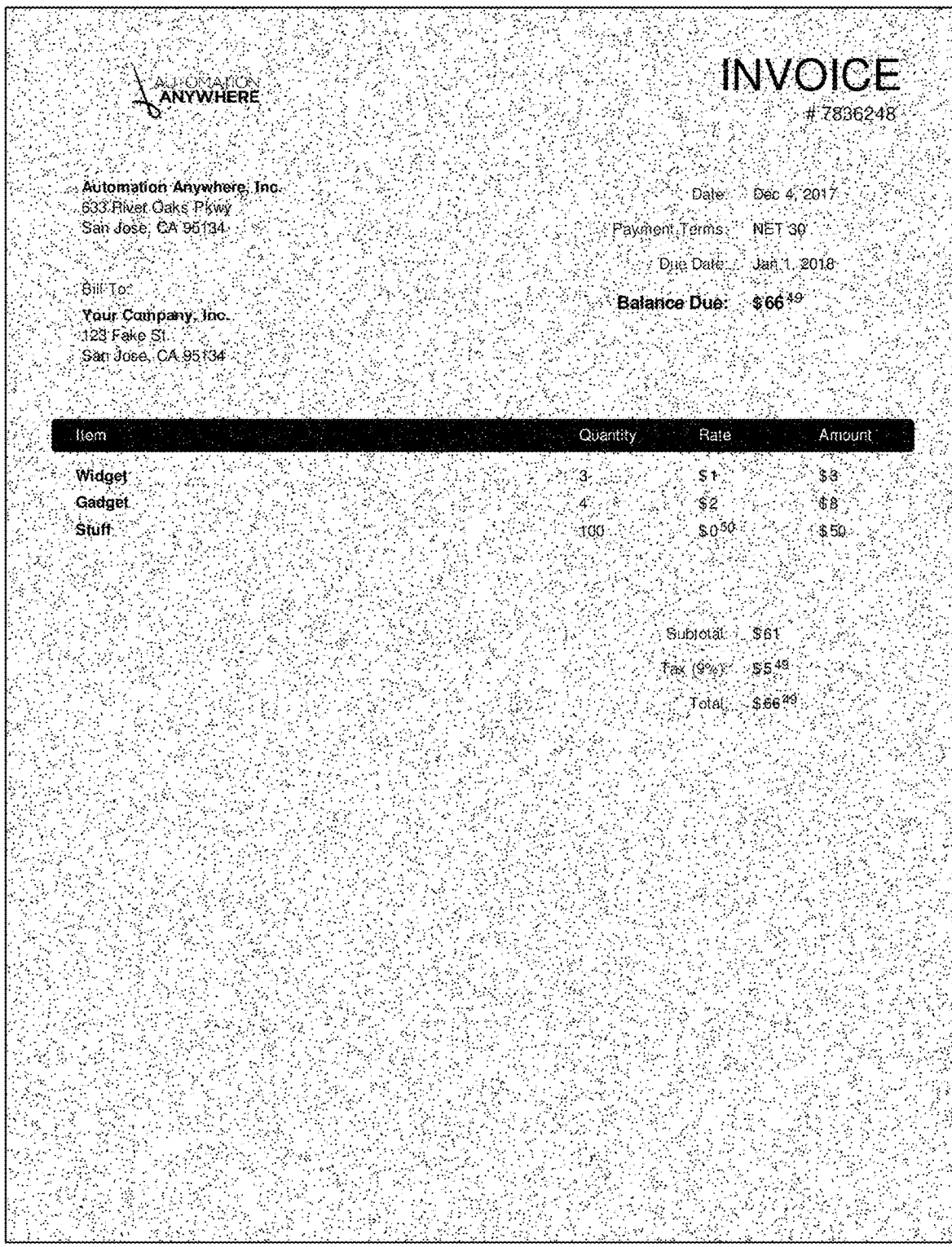
FIG. 13 shows an example of image 200 modified by salt and pepper noise.

FIG. 13 shows an example of image 200 modified by salt and pepper noise, which may occur for many reasons. Typically, it is seen as the result of binarization on an area of non-uniform intensity such as when there is a smudge on the scanner or even on the paper itself, or even when shadows are cast onto the paper. It may also come from watermarks that have been binarized. As seen, the salt and pepper noise is distributed across substantially the entire image as small black specks, typically single pixels ("pepper") on the background. Though it cannot be seen in the image of FIG. 13, the "salt" component of the noise may be found as small white black specs, typically single pixels, distributed throughout the foreground (black or dark), or printed, parts of the image. The salt and pepper noise module 320 generates the salt and pepper noise in accordance with an intensity parameter that specifies the number of pixels in the image of interest to be affected by the salt and pepper noise. A zero value for the intensity parameter results in no pixels being changed. A one value results in each pixel being affected by salt and pepper such that the image becomes inverted in the colorspace.

Figure 14:
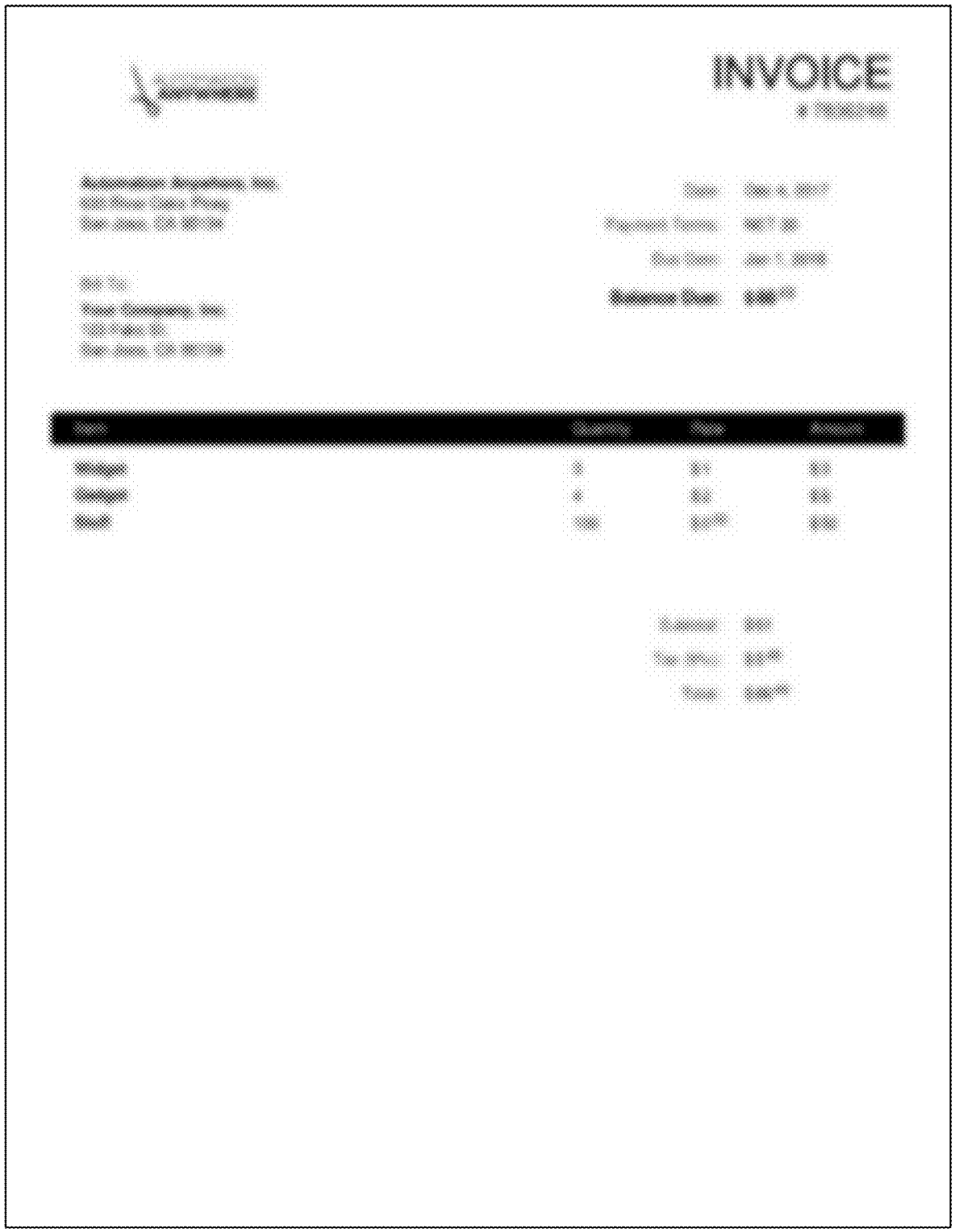
FIG. 14 shows an example of image 200 modified by a gaussian filter.

FIG. 14 shows an example of image 200 modified by a gaussian filter. The gaussian filter module 322 operates conventionally to produce in two-dimensions, a Gaussian surface that has a maximum at the origin, and whose contours are concentric circles with the origin as center. A two-dimensional convolution matrix is precomputed from the formula and convolved with two-dimensional data. Each element in the resultant matrix new value is set to a weighted average of that element's neighborhood. The focal element receives the heaviest weight (having the highest Gaussian value) and neighboring elements receive smaller weights as their distance to the focal element increases. The result is seen in FIG. 14 where each element in the matrix represents a pixel attribute such as brightness or a color intensity, and the overall effect is referred to as a Gaussian blur.

Figure 15:
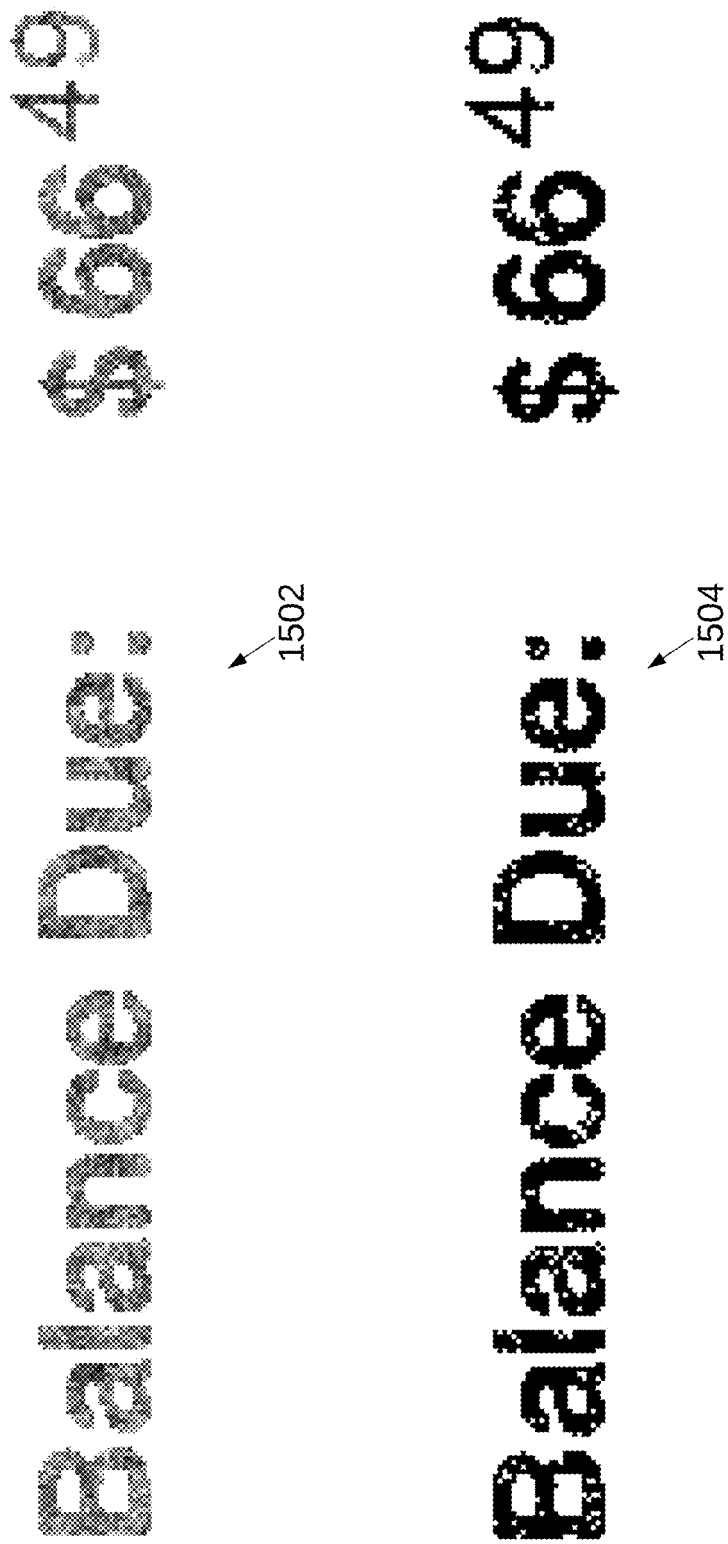
FIG. 15 shows an example of image 200 modified by binarizing.

FIG. 15 shows an example at 1502 in a zoomed in segment view of FIG. 2 of portion 208 that has been modified by ink noise. The image in FIG. 2 has already been binarized so the effect can be seen by binarizing the ink noise modified image 1502, the result of which is shown at 1504. The binarizing module 324 operates to convert each pixel in image 102 into a binary value (zero or one) and has the effect of converting a greyscale image into black and white. In one embodiment, the binarization module 324 may employ a thresholding function such as Otsu's method, Niblack and Sauvola, etc. In another embodiment the binarization module 324 may a user settable parameter as the threshold to determine whether a pixel is black or white.

Figure 16:
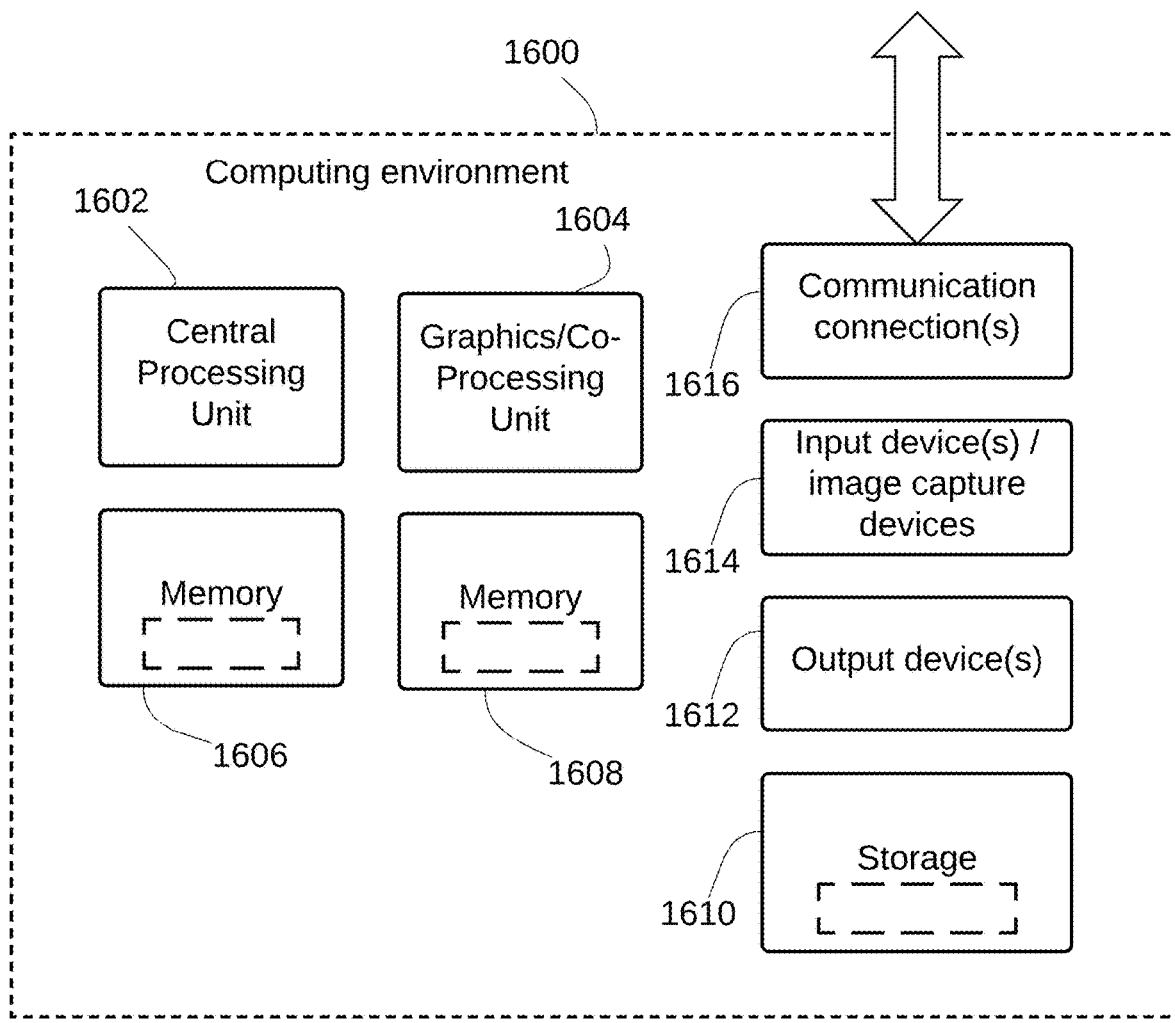
FIG. 16 illustrates a block diagram of hardware that may be employed in an implementation of the system 100.

FIG. 16 depicts a generalized example of a suitable general-purpose computing system 1600 in which the described innovations may be implemented in order to improve the processing speed and efficiency with which the computing system 1600 operates to perform the functions disclosed herein. With reference to FIG. 16 the computing system 1600 includes one or more processing units 1602, 1604 and memory 1606, 1608. The processing units 1602, 1606 execute computer-executable instructions. A processing unit can be a general-purpose central processing unit (CPU), processor in an application-specific integrated circuit (ASIC) or any other type of processor. The tangible memory 1606, 1608 may be volatile memory (e.g., registers, cache, RAM), non-volatile memory (e.g., ROM, EEPROM, flash memory, etc.), or some combination of the two, accessible by the processing unit(s). The hardware components in FIG. 16 may be standard hardware components, or alternatively, some embodiments may employ specialized hardware components to further increase the operating efficiency and speed with which the system 100 operates.

Computing system 1600 may have additional features such as for example, storage 1610, one or more input devices 1614, one or more output devices 1612, and one or more communication connections 1616. An interconnection mechanism (not shown) such as a bus, controller, or network interconnects the components of the computing system 1600. Typically, operating system software (not shown) provides an operating system for other software executing in the computing system 1600, and coordinates activities of the components of the computing system 1600.

The tangible storage 1610 may be removable or non-removable, and includes magnetic disks, magnetic tapes or cassettes, CD-ROMs, DVDs, or any other medium which can be used to store information in a non-transitory way and which can be accessed within the computing system 1600. The storage 1610 stores instructions for the software implementing one or more innovations described herein.

The input device(s) 1614 may be a touch input device such as a keyboard, mouse, pen, or trackball, a voice input device, a scanning device, or another device that provides input to the computing system 1600. For video encoding, the input device(s) 1614 may be a camera, video card, TV tuner card, or similar device that accepts video input in analog or digital form, or a CD-ROM or CD-RW that reads video samples into the computing system 1600. The output device(s) 1612 may be a display, printer, speaker, CD-writer, or another device that provides output from the computing system 1600.

The communication connection(s) 1616 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method executable by one or more processors for adding distortions to a computer-generated image of a document stored in an image file, the method comprising:
   retrieving an original computer-generated image file from a set of image files;
   processing the retrieved computer-generated image file one or more times to generate one or more distorted image files for each original computer-generated image file by,
      selecting one or more augmentation modules, executable by the one or more processors, from a set of augmentation modules to form an augmentation sub-system;
      processing, with the one or more processors, the original computer-generated image file with the augmentation sub-system to generate an augmented image file by altering the original computer-generated image file to add distortions that simulate distortions introduced during scanning of a paper-based representation of a document represented in the original computer-generated image file; and
      storing the augmented image file.

2. The computerized method of claim 1 wherein selecting one or more augmentation modules, executable by the one or more processors, from a set of augmentation modules to form an augmentation sub-system comprises:
   randomly selecting two or more augmentation modules from the set of augmentation modules; and
   sequentially ordering the two or more augmentation modules to form the augmentation sub-system, executable by the one or more processors, comprising an input to receive the original computer-generated image file into a first of the selected augmentation modules, and an output to provide, by a last of the selected augmentation modules, the augmented image file.

3. The computerized method of claim 2 further comprising:
   generating multiple augmentation sub-systems, executable by the one or more processors, where each augmentation sub-system comprises a set of augmentation modules different from each other augmentation sub-system; and
   processing, with the one or more processors, the original computer-generated image file with each augmentation sub-system to generate a plurality of augmented image files, each of the plurality of augmented image files simulating a different set of distortions introduced during scanning of a paper-based representation of a document represented in the original computer-generated image file.

4. The computerized method of claim 1 wherein the augmentation modules, executable by the one or more processors, comprise:
   an augmentation module, executable by the one or more processors, that performs an affine transformation on a computer-generated image of a document stored in an image file.

5. The computerized method of claim 1 wherein the augmentation modules, executable by the one or more processors, comprise:
   an augmentation module, executable by the one or more processors, that performs a non-affine transformation on a computer-generated image of a document stored in an image file.

6. The computerized method of claim 1 wherein the augmentation modules, executable by the one or more processors, comprise:
   an augmentation module, executable by the one or more processors, that introduces scan lines, that may added by a scanner when scanning a document, to a computer-generated image of a document stored in an image file.

7. The computerized method of claim 1 wherein the augmentation modules, executable by the one or more processors, comprise:
   an augmentation module, executable by the one or more processors, that introduces blotches, comprising uniformly black irregular spots, to a computer-generated image of a document stored in an image file.

8. The computerized method of claim 1 wherein the augmentation modules, executable by the one or more processors, comprise:
   an augmentation module, executable by the one or more processors, that introduces multiscale uniform noise, comprising simulation of physical effects of paper and ink of a scanned document, to a computer-generated image of a document stored in an image file.

9. The computerized method of claim 1 wherein the augmentation modules, executable by the one or more processors, comprise:
   an augmentation module, executable by the one or more processors, that introduces ink noise, to a computer-generated image of a document stored in an image file.

10. The computerized method of claim 1 wherein the augmentation modules, executable by the one or more processors, comprise:
    an augmentation, executable by the one or more processors, module that introduces paper noise, to a computer-generated image of a document stored in an image file.

11. The computerized method of claim 1 wherein the augmentation modules, executable by the one or more processors, comprise:
  an augmentation module, executable by the one or more processors, that introduces compression artifacts, to a computer-generated image of a document stored in an image file.

12. The computerized method of claim 1 wherein the augmentation modules, executable by the one or more processors, comprise:
  an augmentation module, executable by the one or more processors, that introduces a computer-generated imitation of handwriting, to a computer-generated image of a document stored in an image file.

13. The computerized method of claim 1 wherein the augmentation modules, executable by the one or more processors, comprise:
  an augmentation module, executable by the one or more processors, that introduces salt and pepper noise lines, to a computer-generated image of a document stored in an image file.

14. The computerized method of claim 1 wherein the augmentation modules, executable by the one or more processors, comprise:
  an augmentation module, executable by the one or more processors, that introduces distortions caused by a gaussian filter, to a computer-generated image of a document stored in an image file.

15. The computerized method of claim 1 wherein the augmentation modules, executable by the one or more processors, comprise:
  an augmentation module, executable by the one or more processors, that introduces distortions caused by binarizing, to a computer-generated image of a document stored in an image file.

16. The computerized method of claim 1 further comprising:
  providing the augmented image file to a deep neural network as a training set of documents to train the deep neural network.

17. A document processing system comprising:
  data storage for storing a first set of original documents that are in image format, and a second set of documents comprising augmented documents in an image format, where each augmented document corresponds to and represents an augmented version of an original document in the first set of documents; and
  one or more processors operatively coupled to the data storage and configured to execute instructions that when executed cause the one or more processors to alter a selected original document from the first set of original documents to generate an augmented document for the second set of documents, wherein the augmented document contains distortions that resemble distortions introduced during scanning of a paper based representation of a corresponding first document image, by:
    selecting an original document from the first set of original documents;
    selecting one or more augmentation modules from a set of augmentation modules to form an augmentation sub-system, executable by the one or more processors, wherein the set of augmentation modules comprises augmentation modules selected from modules that, perform an affine transformation, perform a non-affine transformation, introduce scan lines, introduce blotches, introduce multiscale uniform noise, introduce ink noise, introduce paper noise, introduce compression artifacts, introduce a computer-generated imitation of handwriting, introduce salt and pepper noise lines, introduce distortions caused by a gaussian filter, and introduce distortions caused by binarizing;
    processing, with the one or more processors, the original document with the augmentation sub-system to generate an augmented document by altering the original document to add distortions that simulate distortions introduced during scanning of a paper-based representation of a document represented in the original document; and
    storing the augmented document to the document storage.

18. The document processing system of claim 17 wherein the one or more processors are configured to execute instructions that when executed cause the one or more processors to perform the operation of selecting one or more augmentation modules from a set of augmentation modules to form an augmentation sub-system, executable by the one or more processors, by randomly selecting one or more augmentation modules from the set of augmentation modules; and
  sequentially ordering the one or more augmentation modules to form the augmentation sub-system executable by the one or more processors, comprising an input to receive the original document into a first of the selected augmentation modules, and an output to provide, by a last of the selected augmentation modules, the augmented document.

19. The document processing system of claim 18 wherein the one or more processors are configured to execute instructions that when executed cause the one or more processors to:
  generate multiple augmentation sub-systems, where each augmentation sub-system is executable by the one or more processors and comprises a set of augmentation modules different from each other augmentation sub-system; and
  process the original document with each augmentation sub-system to generate a plurality of augmented documents, each of the plurality of augmented documents simulating a different set of distortions introduced during scanning of a paper-based representation of a document represented in the original document.

20. The document processing system of claim 19 wherein the one one or more processors are configured to execute instructions that when executed cause the one or more processors to provide the augmented documents in the document storage to a deep neural network as a training set of documents to train the deep neural network.

21. A document processing system comprising:
  data storage for storing a first set of original documents that are in image format, and a second set of documents comprising augmented documents in an image format, where each augmented document corresponds to and represents an augmented version of an original document in the first set of documents; and
  one or more processors operatively coupled to the data storage and configured to execute instructions that when executed cause the one or more processors to alter a selected original document from the first set of original documents to generate an augmented document for the second set of documents, wherein the augmented document contains distortions that resemble distortions introduced during scanning of a paper based representation of a corresponding first document image, by:

selecting an original document from the first set of original documents;

selecting one or more augmentation modules from a set of augmentation modules to form an augmentation sub-system, executable by the one or more processors, wherein the set of augmentation modules comprises augmentation modules selected from modules that recreate noise generated in flatbed-scanned document images;

processing the original document with the augmentation sub-system to generate an augmented document by altering the original document to add distortions that simulate distortions introduced during scanning of a paper-based representation of a document represented in the original document; and storing the augmented document to the document storage.

* * * * *